United States Patent
Park et al.

(10) Patent No.: US 11,539,450 B2
(45) Date of Patent: Dec. 27, 2022

(54) METHOD AND APPARATUS FOR ANALYZING COMMUNICATION ENVIRONMENT IN WIRELESS COMMUNICATION SYSTEM

(71) Applicant: Samsung Electronics Co., Ltd., Suwon-si (KR)

(72) Inventors: Yoonsung Park, Suwon-si (KR); Sungbum Park, Seoul (KR); Soonyoung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 306 days.

(21) Appl. No.: 16/645,716

(22) PCT Filed: Sep. 27, 2018

(86) PCT No.: PCT/KR2018/011388
§ 371 (c)(1),
(2) Date: Mar. 9, 2020

(87) PCT Pub. No.: WO2019/066470
PCT Pub. Date: Apr. 4, 2019

(65) Prior Publication Data
US 2020/0304219 A1    Sep. 24, 2020

(30) Foreign Application Priority Data
Sep. 29, 2017   (KR) .......... 10-2017-0128178

(51) Int. Cl.
H04B 17/391    (2015.01)
H04B 17/309    (2015.01)
(Continued)

(52) U.S. Cl.
CPC ........... *H04B 17/391* (2015.01); *G06V 20/13* (2022.01); *H04B 17/309* (2015.01); *H04W 16/22* (2013.01); *G06V 20/194* (2022.01)

(58) Field of Classification Search
CPC .................. H04B 17/3912; H04B 17/391; H04B 10/118; H04B 7/18523; H04B 17/309;
(Continued)

(56) References Cited

U.S. PATENT DOCUMENTS 5,574,466 A    11/1996  Reed et al.
6,785,547 B1    8/2004  Heiska et al.
(Continued)

FOREIGN PATENT DOCUMENTS

| CA | 2270133 A1 * | 5/1988 |
| CN | 1806403 A | 7/2006 |

(Continued)

OTHER PUBLICATIONS

Keysight Technologies, 'Comparison of mmWave Channel models and measurements with TS 38.901', R4-1706876, 3GPP TSG-RAN WG4 NR Ad hoc #2, Hangzhou, China, Section 2.1.4, 2.1.6, Jun. 19, 2017.
(Continued)

*Primary Examiner* — Nizar N Sivji
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety (Continued)

services. A communication environment analysis method according to the present invention comprises the steps of: receiving satellite information and image information of a certain area; identifying area information of an object that is not contained in the image information, on the basis of the satellite information; determining characteristic information of the object; and analyzing a communication environment of the certain area on the basis of the characteristic information, wherein the object is one that causes signal attenuation due to at least one of signal scattering and signal absorption.

12 Claims, 21 Drawing Sheets

(51) Int. Cl.
  *H04W 16/22* (2009.01)
  *G06V 20/13* (2022.01)
  *G06V 20/10* (2022.01)

(58) Field of Classification Search
  CPC ...... H04B 17/27; G06V 20/13; G06V 20/194; H04W 16/22
  See application file for complete search history.

(56) References Cited

U.S. PATENT DOCUMENTS

| | | | |
|---|---|---|---|
| 2005/0136845 A1* | 6/2005 | Masuoka | G01S 1/042 455/67.14 |
| 2007/0093212 A1 | 4/2007 | Sugahara | |
| 2010/0103868 A1* | 4/2010 | Meng | H04W 16/18 370/328 |
| 2014/0028800 A1 | 1/2014 | Tin | |
| 2014/0219566 A1* | 8/2014 | Rodriguez | G06V 10/24 382/190 |
| 2016/0379388 A1* | 12/2016 | Rasco | G06N 5/003 715/753 |
| 2017/0019797 A1* | 1/2017 | Rubio | G06V 10/457 |
| 2017/0094530 A1* | 3/2017 | Ross | H04B 7/18504 |
| 2017/0250751 A1* | 8/2017 | Kargieman | G06V 20/176 |
| 2018/0139623 A1 | 5/2018 | Park et al. | |

FOREIGN PATENT DOCUMENTS

| | | | |
|---|---|---|---|
| CN | 105303184 A | * | 2/2016 |
| KR | 10-2018-0055622 A | | 5/2018 |
| WO | 98/04059 A1 | | 1/1998 |

OTHER PUBLICATIONS

Samsung, 'Analysis of a Map-based Hybrid Channel Model', R1-1716064, 3GPP TSG RAN WG1 Meeting NR#3, Nagoya, Japan, Section 1-2, Sep. 12, 2017.
Keysight Technologies, 'Angular and Temporal Statistics for mmWave frequencies based on ray tracing in Bristol', R4-1706881, 3GPP TSG-RAN WG4 NR Ad hoc #2, Hangzhou, China, Section 1-4, Jun. 19, 2017.
Huawei etc., 'Consideration on channel model for LTE Aerial', R1-1709291, 3GPP TSG RAN WG1 Meeting #89, Hangzhou, China, Section 1-5.3, May 18, 2017.
ZTE etc., 'Beamforming procedure considering high frequency channel characteristics', R1-1700126, 3GPP TSG RAN WG1 NR Ad-Hoc Meeting, Spokane, USA, Section 1-2.4, Jan. 10, 2017.
European Search Report dated Sep. 24, 2020, issued in European Patent Application No. 18862257.5.
Chinese Office Action dated Nov. 22, 2021, issued in Chinese Patent Application No. 201880063616.X.

* cited by examiner

METHOD AND APPARATUS FOR ANALYZING COMMUNICATION ENVIRONMENT IN WIRELESS COMMUNICATION SYSTEM

TECHNICAL FIELD

The disclosure relates to a method and apparatus for analyzing a communication environment in a wireless communication system and, more particularly, to a method of analyzing a channel based on area information of an object located on a path along which a signal is transmitted and characteristic information of the object using satellite signals.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As described above, in the 5G communication system, there is a need for a scheme for estimating a channel environment and thus performing network planning based on the estimated channel. In network planning, in order to enable network services through wireless communication in a specific area, the location of a transmitter (Tx) that transmits a radio frequency (RF) signal and a setting value for the transmission are determined. Information of various RF signals is determined at the location of a receiver (Rx). A channel environment is analyzed based on a mathematic modeling scheme or RT simulations results. Accordingly, an optimum Tx location can be determined. As described above, for the analysis of a channel environment, various types of RF signal information (e.g., a path loss or coverage) may be provided. Network planning may be performed based on the RF signal information.

However, in the 5G system, a signal may be greatly influenced depending on the characteristics of an object or obstacle located in a communication path, that is, a path along which a signal is transmitted, upon network planning because mmWave having a short wavelength and strong straightness is used. Furthermore, if two-dimensional image information (may be hereinafter referred to as "image information" or "street view information") is used to determine characteristic information of the object, there is a problem in that it is difficult to incorporate the characteristics of an object that does not appear in image information. Accordingly, there is a need for a method of identifying area information and characteristic information of an object not appearing in image information and analyzing the state of a channel based on the characteristic information.

DISCLOSURE OF INVENTION

Technical Problem

The disclosure is to provide a method and apparatus having higher accuracy compared to a case where simulations through ray tracing are performed in order to analyze an RF transmission and reception environment.

Furthermore, the disclosure is to provide a method and apparatus capable of identifying area information of an object located in a communication path and characteristic information of the object using satellite information and image information and obtaining more accurate simulation results by incorporating the area information and characteristic information into simulations.

Solution to Technical

In an aspect, a method of analyzing a communication environment includes receiving satellite information and image information for an area, identifying area information of an object not included in the image information based on the satellite information, determining characteristic information of the object, and analyzing a communication environment for the area based on the characteristic information.

The object is an object causing signal attenuation due to at least one of the scattering or absorption of the signal.

Furthermore, in an aspect, a computing apparatus analyzing a communication environment in a wireless communication system includes a transceiver, and a controller configured to receive satellite information and image information for an area, identify area information of an object not included in the image information based on the satellite information, determine characteristic information of the object, and analyze a communication environment for the area based on the characteristic information. The object is an object causing signal attenuation due to at least one of a scattering or absorption of the signal.

Advantageous Effects of Invention

According to the disclosure, the computing apparatus can identify area information and characteristic information of an object located in a communication path using satellite information and image information, and can obtain more accurate simulation results by incorporating the area information and characteristic information into simulations. Accordingly, network planning can be efficiently performed by taking into consideration an influence attributable to an object located in a communication path upon network planning.

MODE FOR THE INVENTION

Figure 1:
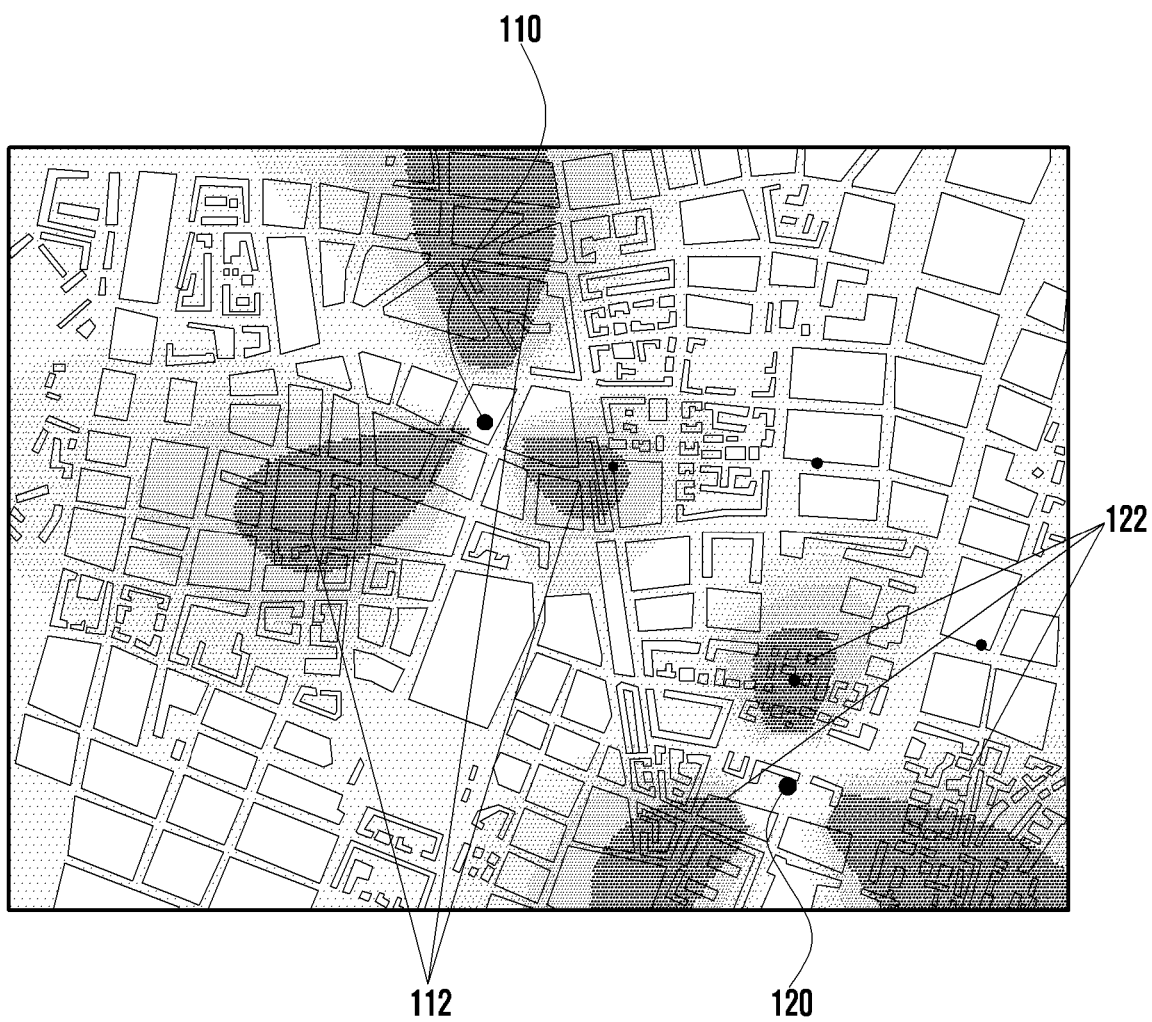
FIG. 1 is a diagram for describing network planning using a mathematic modeling scheme.

Hereinafter, embodiments of the disclosure will be described in detail with reference to the accompanying drawings.

In describing the embodiments, a description of contents that are well known in the art to which the disclosure pertains and are not directly related to the disclosure is omitted in order to make the gist of the disclosure clearer.

For the same reason, in the accompanying drawings, some elements are enlarged, omitted or depicted schematically. Furthermore, the size of each element does not accurately reflect its real size. In the drawings, the same or similar elements are assigned the same reference numerals.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure of the disclosure and to allow those skilled in the art to understand the category of the disclosure. The disclosure is defined by the category of the claims. The same reference numerals will be used to refer to the same or similar elements throughout the drawings.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational operations to be performed on the computer or other programmable apparatus to produce a computer-executed process, so that the instructions performing the computer or other programmable apparatus provide operations for executing the functions described in the flowchart block(s).

Furthermore, each block of the flowchart illustrations may represent a portion of a module, a segment or code, which includes one or more executable instructions for implementing a specified logical function(s). It should also be noted that in some alternative implementations, the functions noted in the blocks may be performed out of order. For example, two blocks shown in succession may in fact be executed substantially concurrently or the blocks may sometimes be executed in the reverse order, depending upon the functionality involved.

In this case, the term "unit", as used in the present embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further identified into additional components and "units." Furthermore, the components and "units" may be implemented to operate on one or more CPUs within a device or a security multimedia card. Furthermore, in one embodiment, "unit" may include one or more processors.

Furthermore, in an embodiment, in drawings in which methods are described, the sequence of descriptions does not essentially correspond to the sequence of execution, and the context may be changed or executed in parallel.

FIG. 1 is a diagram for describing network planning using a mathematic modeling scheme.

Referring to FIG. 1, transmitters 110 and 120 may form transmitted beams 112 and 122 and transmit signals.

As described above, in a mathematic modeling scheme, RF information may be predicted through a function explicitly represented through a signal transmission and reception modeling scheme using the frequency and distance of a transmission signal as inputs. As in the drawing, the transmitters 110 and 120 may form the beams 112 and 122 each having different three directions. Accordingly, the RF characteristic of the transmission signal may be applied through the modeling scheme. If the mathematic modeling scheme is applied as described above, RF information can be predicted with a less computational load, but there is a disadvantage in that the accuracy of such modeling is reduced with respect to an RF signal having a high frequency.

As described above, in order to analyze channel characteristics related to a high frequency RF signal, to apply a simulation scheme through ray tracing may be taken into consideration. In such a case, a channel environment may be analyzed by taking into consideration paths along which an RF signal may be transmitted. If such a method is used, however, a computational load may be increased. In order to guarantee accuracy, there is a need for a method capable of incorporating an actual environment into simulations.

Figure 2:
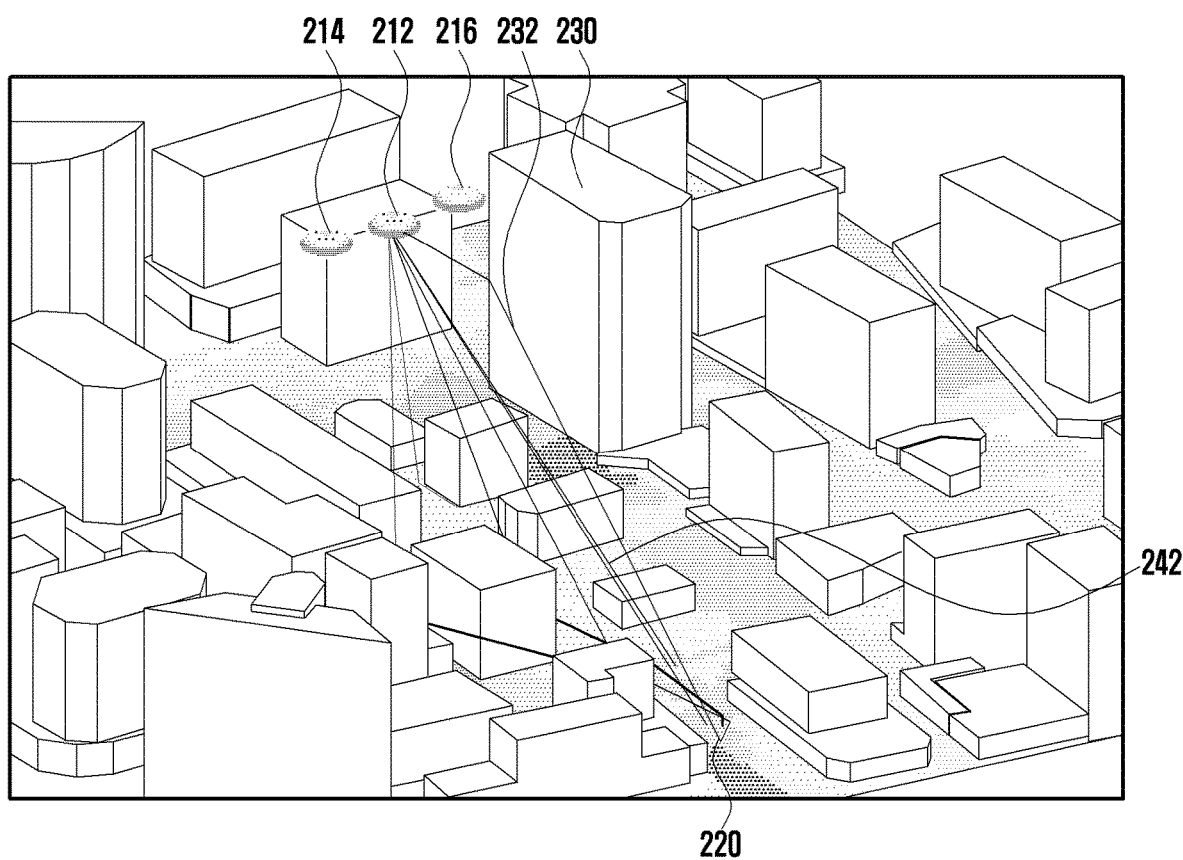
FIG. 2 is a diagram for describing a RT simulations method according to an embodiment of this specification.

FIG. 2 is a diagram for describing a ray tracing (RT) simulation method according to an embodiment of this specification.

Referring to FIG. 2, it is assumed that one or more transmitters 212, 214 and 216 transmit signals. Accordingly, the intensity of a received signal transmitted by each of the transmitters 212, 214 and 216 is indicated on a map using light and shade. A deeper color is an area having stronger reception intensity. A lighter color has weaker signal intensity.

More specifically, assuming the location of a receiver 220, the reception intensity of a signal may be determined in a corresponding area. Furthermore, a transmission channel for each of available paths from one transmitter 212 to the receiver 220 may be determined. There may be a signal 242 directly transmitted from the transmitter 212 to the receiver 220, and there may be a signal 232 that is reflected and received by another object 230. As described above, if simulations through RT are performed, information on the intensity of a signal received from the transmitter 212, 214, 216 and the transmission path of the corresponding signal in a specific area can be obtained. When signal reception intensity according to the transmission path of the signal is determined, if at least one of the reflecting surface material or external shape of an object is taken into consideration, more accurate signal reception information can be obtained by the receiver 220. In an embodiment, the surface material is described, but this does not mean only the external surface of an object, and is a concept including even an internal material that may affect the reflection of a radio wave. More accurate characteristics of the reflection of a radio wave can be estimated based on such information. Furthermore, in an embodiment, the location of a receiver may be determined based on window location information, and may be obtained by additionally inputting additional information to simulations for network planning or may be obtained by user setting.

Furthermore, an obstacle that may transmit a radio wave may be located in a path along which a signal is directly transmitted. An example of the obstacle may be a tree. In addition to a tree, an obstacle in which the attenuation of a signal may occur while transmitting a radio wave may be taken into consideration upon RT simulation. More accurate simulation results can be obtained by taking into consideration information on an object that may transmit a radio wave as described above. The tree is an example of an obstacle that is located in a communication path and causes the attenuation of a signal when transmitting a radio wave, and may be an installation positioned in different plants or communication paths. In addition, the obstacle may include other objects which may cause the attenuation of a signal.

At least one of an optimum location of a transmitter and an optimum location of a receiver in a map can be determined by performing RT as described above. Furthermore, in some embodiments, RT simulation may be performed by taking into consideration a plurality of transmitter location candidates and receiver location candidates. At least one of the location of a transmitter and the location of a receiver may be determined based on RT results. In an embodiment, to determine the location of a transmitter through RT simulations may be one characteristic for network planning. Accordingly, the locations of more transmitter candidates than the number of locations where transmitters will be finally installed are determined. RT simulations are performed based on the determined locations. A combination of optimum locations of base stations may be obtained through post-processing based on information of rays obtained from signals transmitted by all the base station candidates.

As described above, in the RT simulation scheme, a transmission channel for each path along which an RF signal travels may be determined. RF signal information may be predicted at the location of the receiver 220 based on the transmission channel. In an embodiment, in the RT simulation scheme, in a process of determining a channel environment according to the path of a signal, more accurate RF signal information can be predicted by computing at least one of the environment (e.g., the type of medium) of a corresponding path, 3D topography, or reflection or diffraction attributable to a building in addition to the distance of a transmitted signal. Furthermore, a channel estimation method using the RT simulation scheme is not limited by the frequency of an RF signal, can precisely incorporate an actual environment, and may determine at least one of an optimum transmission location or reception location based on simulation results.

Furthermore, a 5G network uses an ultra-high frequency signal of 28-60 GHz. Accordingly, accuracy can be increased using the RT simulation scheme not the mathematic modeling scheme in order to find radio signal information in a 5G network planning tool. In an example of RT simulations, when a path in which a radio wave is reflected by a building after colliding against the building is predicted, the reflection may be computed assuming that the surfaces of all buildings have the same RF properties. However, such an assumption does not guarantee accurate simulation results because reflectance of an RF signal is different depending on the surface material, external shape and pattern of a reflection surface. Accordingly, there is a need for an RT scheme in which such information has been taken into consideration.

In order to perform RT simulations as described above, it is necessary to obtain deployment and topography information of a building and to analyze a signal transmission and reception environment based on map data to which the deployment and topography information has been mapped. A link between a transmitter and a receiver and the entire communication system performance can be analyzed based on the signal transmission and reception environment. Furthermore, if system performance based on simulation results does not satisfy a preset criterion, another transmitter may be taken into consideration, and RT simulations may be repeatedly performed based on a change in simulation setting. As described above, in order to analyze the communication environment of a communication system, particularly, a 5G communication system, an RF planning method and apparatus into which radio wave characteristics of mmWave have been incorporated are necessary. Accordingly, in order to perform RT more effectively, it is necessary to obtain actual environment (tree or reflector) information that affects a radio wave environment and to perform simulations by taking the actual environment (tree or reflector) information into consideration. As described above, for RF planning through simulations, a parallelism for acceleration and automation improvements, a operation-by-step analysis scheme, and an object extraction-based deployment scheme may be necessary.

Furthermore, in an embodiment, in order to provide communication services to a specific area, an RF network planning method for analyzing the radio wave path of the corresponding area and positioning a base station at an efficient location and an apparatus using the same are necessary.

Figure 3A:
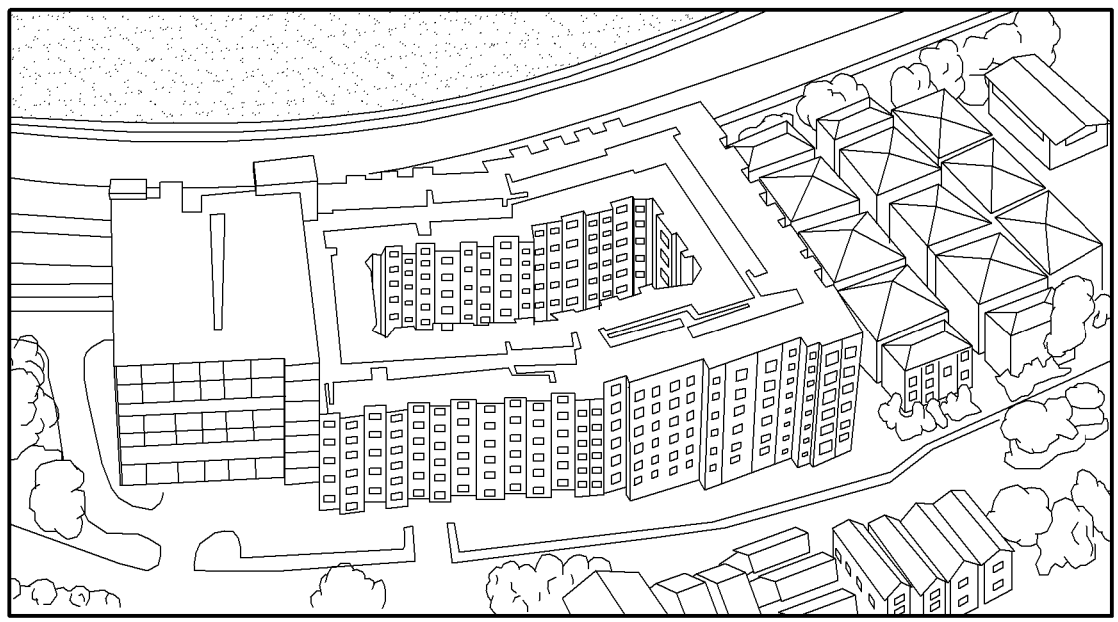
FIGS. 3A and 3B are diagrams for describing a method of obtaining three-dimensional map information according to an embodiment of this specification.
Figure 3B:
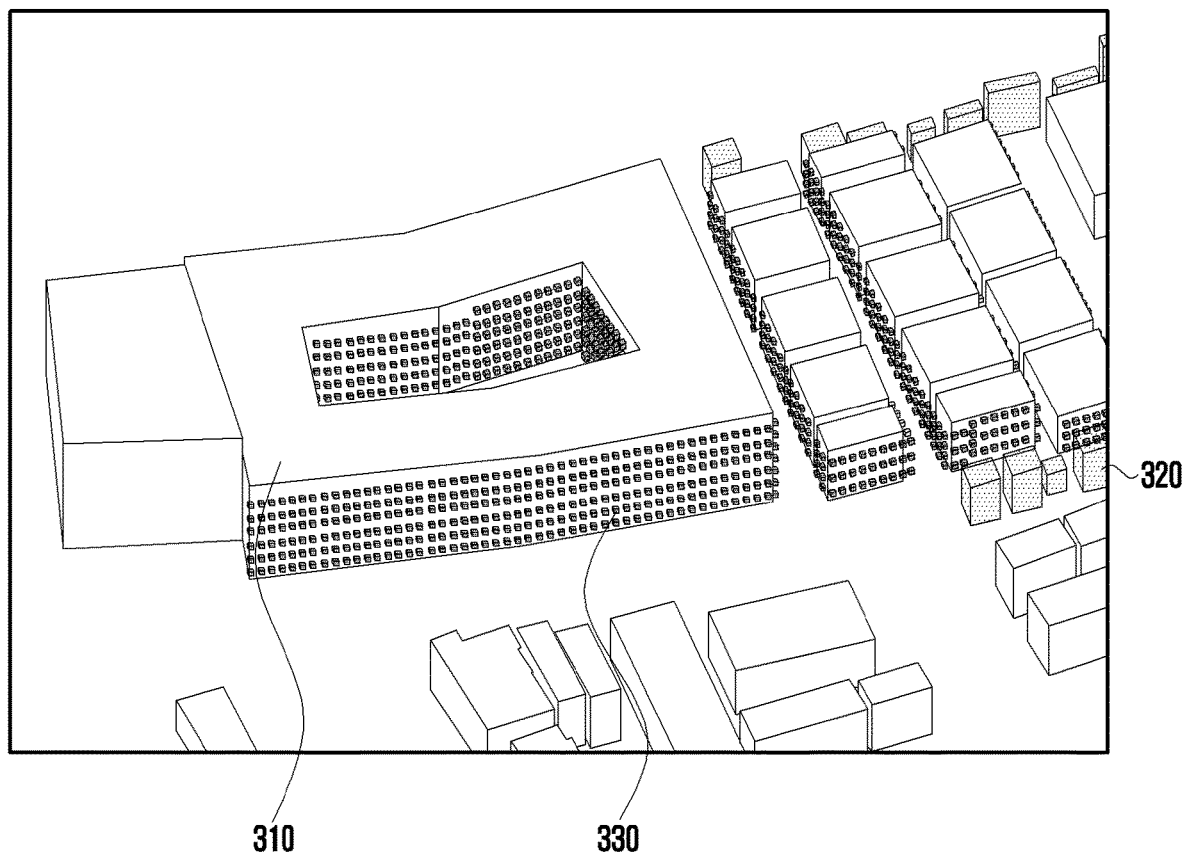

FIGS. 3A and 3B are diagrams for describing a method of obtaining three-dimensional (3-D) map information according to an embodiment of this specification.

Referring to FIGS. 3A and 3B, 3-D map information may be obtained based on actual image information of FIG. 3A and location information corresponding to the image information. More specifically, 3-D map information of FIG. 3B may be obtained so that RT simulations can be performed based on the image information.

The map information obtained in FIG. 3B may include a building 310, a receiver candidate area 330, and a tree 320. Map information is obtained as described above. A transmitter location candidate and a location of the receiver candidate may be determined based on the map information. Accordingly, at least one of an optimum location of a transmitter or an optimum location of a receiver may be determined by performing RT simulations.

Furthermore, in an embodiment, an element, such as the building 310, may have a characteristic that it reflects or scatter a radio wave. In the case of such an element, more accurate simulation results may be obtained by taking into consideration a surface material and an external shape.

Furthermore, in an embodiment, the tree 320 may transmit a radio wave, but the transmitted radio wave may experience great attenuation of a signal compared to air. As described above, more accurate simulation results can be obtained by taking into consideration radio wave transmission characteristics of an object, such as the tree 320.

Furthermore, in an embodiment, RT may be selectively performed on the receiver candidate area 330. The receiver candidate area may include an area where a fixed or movable receiver may be installed. More specifically, a receiver may be installed in the window area of the building 310. The receiver installed in the window area may function as a relay in communication between another receiver within the building and a transmitter outside the building. As described above, a result value in which a better signal reception environment has been taken into consideration can be obtained by performing RT simulation by taking the receiver candidate area 330 into consideration.

Figure 4A:
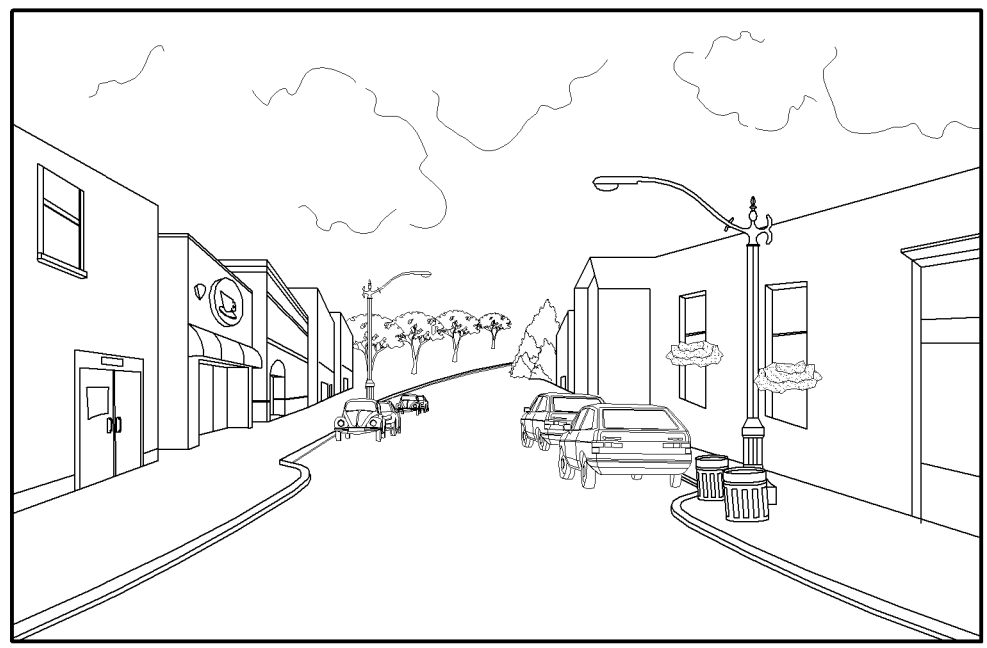
FIGS. 4A and 4B are diagrams for describing a method of obtaining material information of an object within an image based on image information according to an embodiment of this specification.
Figure 4B:
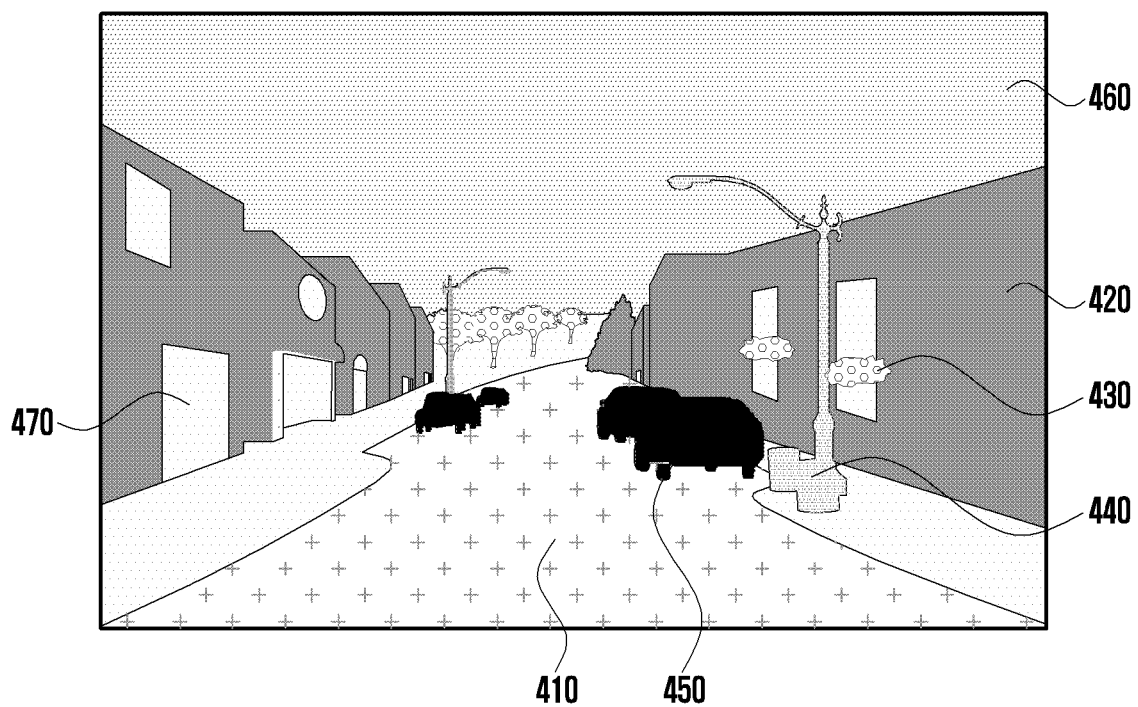

FIGS. 4A and 4B are diagrams for describing a method of obtaining material information of an object within an image based on image information according to an embodiment of this specification.

Referring to FIGS. 4A and 4B, the materials of an object indicated within an image in image information may be determined. More specifically, the materials of an object within an image in image information may be determined based on a deep learning-based computer vision technology. A more detailed deep learning-based computer vision technology and related characteristics are described later.

In an embodiment, the results of FIG. 4B may be obtained by analyzing the image information of FIG. 4A. In this case, each element may be determined based on at least one of color, light and shade, reflectance, a mutual position relation between elements, or the deployment of all elements in the image. In an embodiment, materials, such as asphalt 410, concrete 420, plants 430, a steel structure 440, a vehicle 450, sky 460 and glass 470, may be determined through image analysis. As described above, more accurate results can be obtained by determining the materials of elements indicated within an image based on image information and incorporating the characteristics of the materials into RT simulations.

Figure 5:
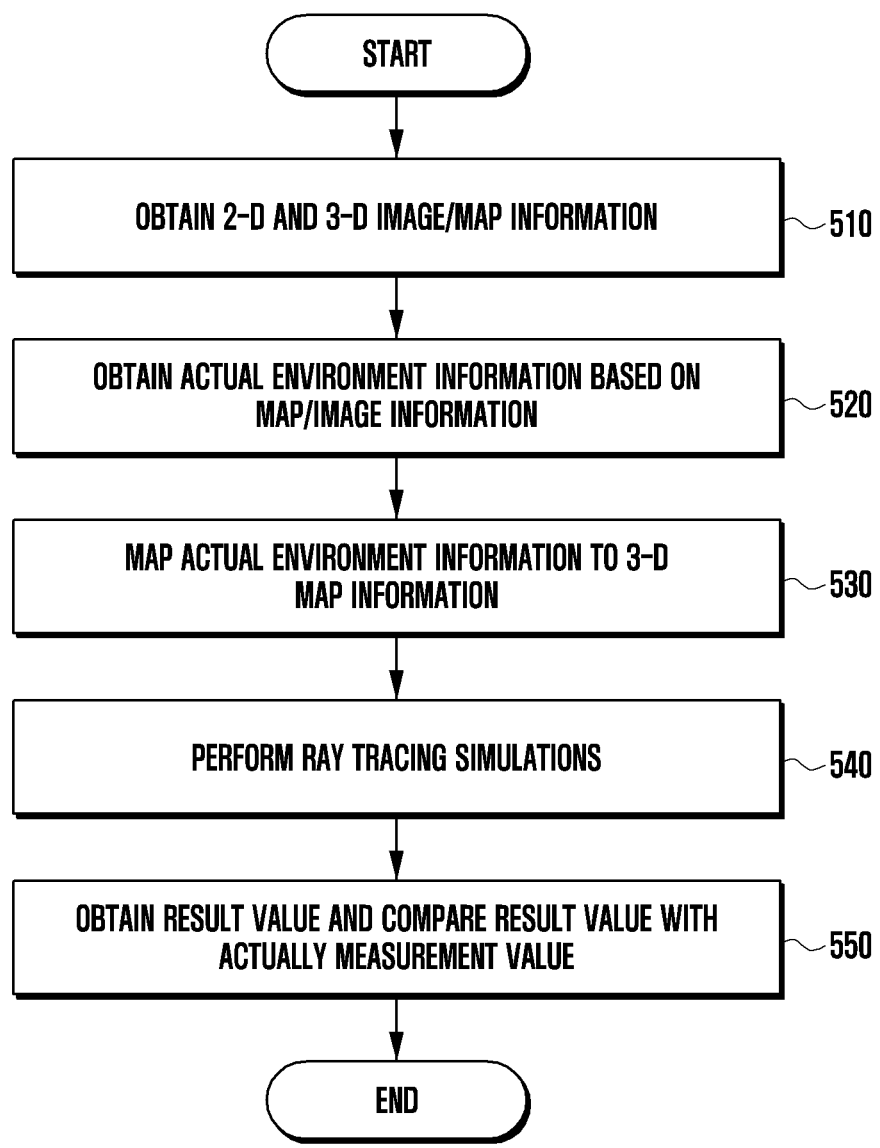
FIG. 5 is a diagram for describing a method of analyzing a communication channel environment through ray tracing according to an embodiment of this specification.

FIG. 5 is a diagram for describing a method of analyzing a communication channel environment through RT according to an embodiment of this specification.

Referring to FIG. 5, a method for performing RT simulations is disclosed. In an embodiment, the RT simulations may be performed in a computing apparatus including a controller. The computing apparatus may be a computing apparatus including a centralized processor, and may include a personal computer, a workstation, etc. Hereinafter, in an embodiment, the simulation may be described as being performed by the computing apparatus.

At operation 510, the computing apparatus may obtain two-dimensional (2-D) image information and 3-D map information. In an embodiment, the 2-D image information may include additional information corresponding to an image. The additional information may include photographing information, including location information, direction information, and view angle of a captured image. 3-D map information (may be hereinafter referred to as "map information") corresponding to the 2-D image information may be determined based on the additional information. Furthermore, the 3-D map information may include location information and 3-D map information corresponding to the location information. Such information may include information on shapes of a building, a structure, and plants on the surface of the earth or the surface of the water. In some embodiments, such information may include information related to at least one of a transmitter candidate location or a receiver candidate location.

In the disclosure, 2-D image information may be described as image information. That is, in the disclosure, image information may be configured with a two dimension. However, an embodiment of the disclosure is not limited thereto, and the disclosure may include an embodiment in which image information is configured in a 3-D manner.

Likewise, in the disclosure, 3-D map information may be described as map information. That is, in the disclosure, map information may be configured with a three dimension. However, an embodiment of the disclosure is not limited thereto, and the disclosure may include an embodiment in which map information is configured in a 2-D manner.

At operation 520, the computing apparatus may obtain actual environment information based on at least one of the map information or the image information. The actual environment information may include an object located in a communication path and the characteristics of the object. More specifically, the characteristics of objects which may be positioned in a communication path may be determined by analyzing the 2-D image information. The characteristics of the objects may include at least one of the materials of a surface of the object or an external shape of the object. In the case of an object capable of transmitting a radio wave, the characteristics of the object may include information related to a shape of the object and a degree of signal attenuation when the object transmits the signal. Furthermore, the actual environment information may also basically include information, such as the type, shape, height, breadth and width of the object. In an embodiment, the extraction of an actual environment may be performed using a deep learning scheme. More specifically, in an embodiment, the computing apparatus may perform machine learning using a database including category information corresponding to an object to be extracted from a target image, may extract the object from the target image when the target image is input based on learning results, and may determine a category corresponding to the extracted object. More specifically, an actual environment entity that affects a radio wave environment may include the materials of various obstacles and the outer walls of buildings, in addition to foliages. For accurate prediction of a radio wave path, in the case of an obstacle affecting a radio wave environment, not only the location of the object, but at least one of type, height, breadth or width information of the object is extracted. Furthermore, in order to automatically determine locations where a receiver and a transmitter are installed, an actual environment entity, such as a road, a streetlamp, an installed pole, a rooftop or a window, may be extracted.

At operation 530, the computing apparatus may map the actual environment information of the communication path to the 3-D map information based on the information obtained at operations 510 and 520. When the 3-D map information is mapped as described above, additional information obtained based on the 2-D image information may be mapped to an object, corresponding to the 3-D map information, based on the additional information included in the 2-D image information. Furthermore, in an embodiment, the computing apparatus may configure (or generate) 3-D map information into which an actual environment has been incorporated based on information of an object extracted at operation 520. According to one embodiment, the computing apparatus may map object information, such as an obstacle such as foliages, a pole, or a rooftop, to a commercial map. A predicted material and window may be matched with a 3D building shape. Information on the materials of an obstacle and a building may be categorized based on a degree that the materials affect radio wave characteristics, may be parameterized using a lookup table and mapping function, and may be subsequently incorporated into RT simulations.

At operation 540, the computing apparatus may perform RT simulations based on the information generated at operation 530. In an embodiment, the computing apparatus may perform corresponding RT simulations while sequentially changing beam information by taking into consideration a beam having a given direction or may perform corresponding RT simulations assuming that beams having all directions which may be transmitted by a transmitter have been transmitted within the same time section. As the results of the execution of the RT simulation, the computing apparatus may predict the quality of a signal which may be received by a receiver by incorporating a path along which the signal transmitted by a transmitter travels in order for the signal to be received by the receiver and actual environment information located in the path, and may analyze the quality of the signal. Furthermore, in an embodiment, when the RT simulations are performed, the computing apparatus may determine at least one of a transmission location or reception location based on the 3-D map information, and may determine a signal transmission environment based on the information mapped at operation 530.

At operation 550, the computing apparatus may obtain a result value based on the RT simulations. The computing apparatus may perform additional RT simulations based on the obtained result value and a value measured in the actual environment. More specifically, if a simulation result value and an actual environment measurement value are different based on a result of comparison, the computing apparatus may change the information, obtained at operation 520, based on the actual environment measurement value, and may generate a simulation result value again. As described above, a more reliable communication channel can be analyzed because RT simulations are performed by incorporating actual environment information into a 3-D map. More specifically, a transmitter and receiver may be directly installed in an area, that is, a target of RT simulations. Basic information for performing RT simulations may be added or updated based on a result value of a signal received by a receiver after the signal is transmitted by a transmitter.

As described above, at least one of an optimum location of a transmitter or an optimum location of a receiver for providing wireless services to a given area within a map may be determined based on the results of RT simulations. Effective network planning may be performed because at least one of an optimum location of a transmitter or an optimum location of a receiver is determined as described above. More specifically, in order to effectively provide a radio signal to a wireless terminal within a given area, an optimum location of a base station may be determined. Effective services can be provided although more less base stations are deployed because an optimum location of the base station is determined as described above.

Furthermore, adaptive network management may be made possible by incorporating signal reception information measured in an actual environment. More specifically, if a surrounding environment is changed after a transmitter is installed, additional RT simulations may be performed by taking the changed environment into consideration. Network management, such as adjusting the location of the transmitter by additionally incorporating a corresponding result value, may be performed. Furthermore, such network management may include changing information related to a beam transmitted by the transmitter in addition to the adjustment of the location of the transmitter. More specifically, the transmitter may determine a transmitted beam and a received beam based on a result value of the RT simulations. In order to determine the transmitted beam and the received beam, beam arrangement may be performed based on a result value of the RT simulations. Such adaptive network management may be periodically performed.

Hereinafter, a detailed method of identifying an object in a communication path and actual environment information, that is, characteristic information of the object, is described.

Figure 6A:
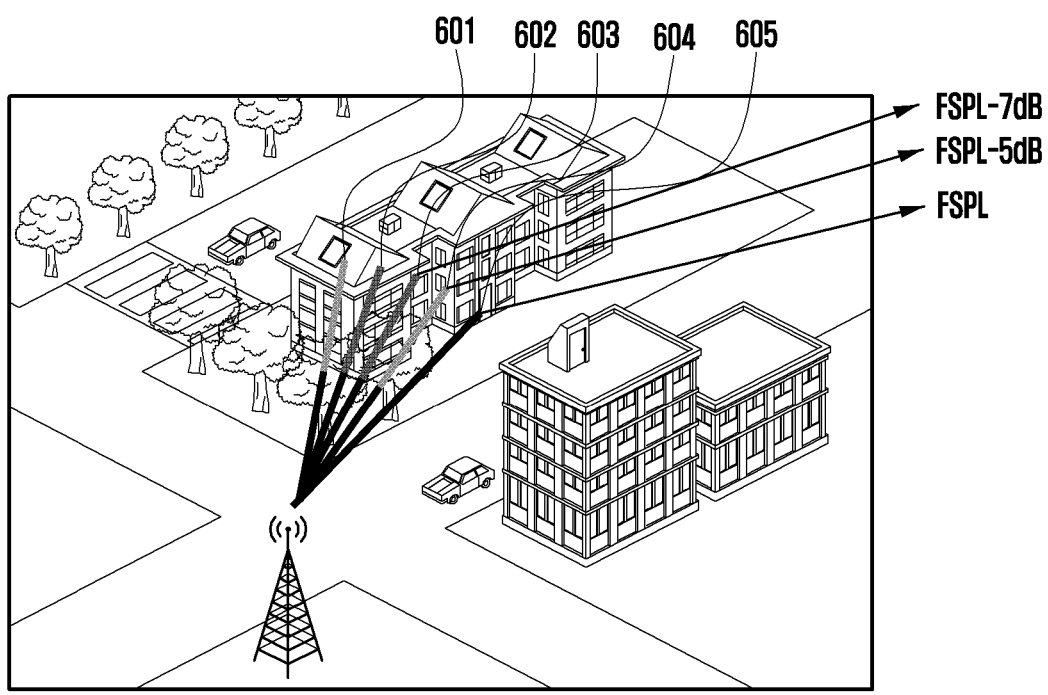
FIG. 6A is a diagram illustrating an object located in a communication path and an influence that the object affects a signal.

FIG. 6A is a diagram illustrating an object located in a communication path and an influence that the object affects a signal.

Referring to FIG. 6A, a signal transmitted by a transmitter may be influenced by an object located in a communication path, that is, a path along which the signal is transmitted. That is, the signal may be attenuated by the object located in the communication path.

In the disclosure, an object that is located in a communication path and that affects a signal may be commonly called an object or an obstacle. In this case, the type of object located in the communication path may be classified based on the characteristics of the object.

For example, an obstacle by which the attenuation of a signal may occur while transmitting a radio wave may be defined as a first type object. Alternatively, the first type object may be defined as an obstacle that causes the attenuation of a signal due to at least one cause of diffraction, scattering or absorption in a process for a radio wave or signal to pass through the object. The first type object may include a tree, for example. In addition to a tree, the first type object may include other objects which may cause the attenuation of a signal while a radio wave is transmitted, scattered, diffracted or absorbed. Furthermore, the first type object may be defined as some parameters of diffraction, scattering or absorption. For example, in the disclosure, the first type object may be defined as an object that causes the attenuation of a signal due to at least one cause of the scattering or absorption of the signal.

In this case, the first type object may be divided into a first part and a second part based on a difference in the size of the attenuation of a signal. If a difference in a reduction in the signal exceeds a threshold, the first type object may be divided into the first part and the second part. For example, in the case of a tree, a difference between the size of the attenuation of a signal in a foliage part and the size of the attenuation of a signal in a trunk part may exceed a threshold. The foliage part may be classified as a first part, and the trunk part may be classified as a second part. However, this is merely an embodiment of the disclosure. The first type object may not be divided into a first part and a second part or may be divided into more parts. For example, a tree not including a foliage may not include a part in which a difference in the size of the attenuation of a signal exceeds a threshold, and may not be divided into a first part and a second part. Furthermore, an object other than the first type object may also be divided into a plurality of parts.

An obstacle that causes the attenuation of a signal by the reflection of a radio wave may be defined as a second type object. For example, the second type object may include a building, a streetlamp, etc.

In addition, various types may be defined based on the characteristics of an object.

The disclosure proposes a method of identifying characteristic information of an object in which the attenuation of a signal attributable to at least one of the transmission, scattering, diffraction or absorption of a radio wave or signal occurs and increasing the accuracy of simulations for analyzing channel characteristics by incorporating the characteristic information into the simulations. As described above, as the accuracy of simulations increases, an optimum Tx location may be determined upon network planning Hereinafter, an object in which the attenuation of a signal attributable to at least one of the transmission, scattering, diffraction or absorption of a radio wave occurs is commonly called an object. However, as described above, the object may be defined as only some parameter of transmission, scattering, diffraction or absorption.

For example, in the disclosure, an object may mean an object in which the attenuation of a signal occurs due to at least one of scattering or absorption occurring due to the transmission of a radio wave or a signal. Alternatively, in the disclosure, an object may mean an object in which the attenuation of a signal occurs due to at least one of transmission, scattering or absorption of a radio wave or signal.

Alternatively, in the disclosure, an object may mean an object in which at least one of the transmissivity, scattering ratio or absorption rate of a radio wave or signal is greater than a threshold. Alternatively, in the disclosure, an object may mean an object in which at least one of a scattering ratio, an absorption rate or a diffraction rate is greater than a threshold. As described above, an object may be defined as only some parameters of transmissivity, a scattering ratio, an absorption rate or a diffraction rate.

For example, in the disclosure, an object may mean an object in which the absorption rate of a signal is greater than a threshold absorption value. Alternatively, an object may mean an object in which the diffraction rate of a signal is greater than a threshold diffraction value, and may include the two conditions or another condition.

Referring back to the description of FIG. 6A, various obstacles may be located between a transmitter and a receiver. A signal transmitted by the transmitter may be attenuated by an object. However, the object may have a different influence on the signal depending on characteristic information of the object. For example, the same object may have a different influence on a signal depending on the shape, size and density of the object and which part of the object the signal passes through.

Specifically, referring to FIG. 6A, it may be seen that a tree is located between the transmitter and the receiver. That is, in the disclosure, an object may include a tree, for example. In this case, it may be seen that a high attenuation of a signal (an attenuation of 7 dB) occurs in a signal 602, 603 that has passed through a part having a high density of foliages, whereas a low attenuation of a signal (an attenuation of 5 dB) occurs in a signal 601, 604 that has passed through a part having a low density of foliages. It may be seen that the attenuation of a signal rarely occurs in a signal 605 that has not passed through an object.

If actual environment information is determined based on image information, there is a problem in that information on an object not appearing in image information is not incorporated into simulations. Accordingly, there is a need for a method of incorporating information on an object, not appearing in image information, into simulations.

Figure 6B:
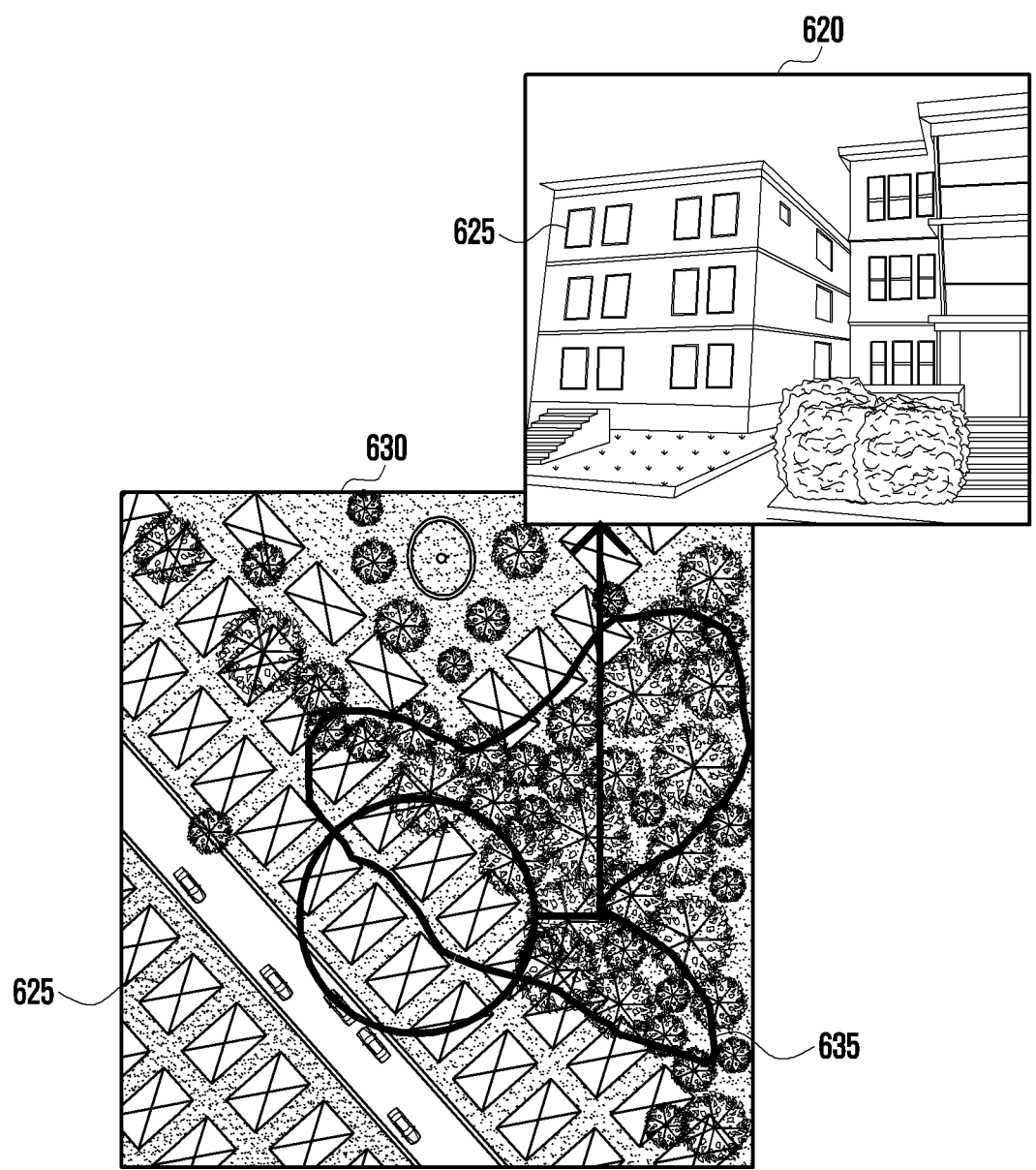
FIG. 6B is a diagram illustrating an influence that an object not appearing in image information affects a signal according to the disclosure.

FIG. 6B is a diagram illustrating an influence that an object not appearing in image information affects a signal according to the disclosure.

Referring to FIG. 6B, image information may be illustrated like 620 in FIG. 6. The computing apparatus may obtain actual environment information based on the image information. For example, an obstacle 625 located in a communication path may be located in the image information 620. The computing apparatus may obtain actual environment information by analyzing the surface material, an external shape, etc. of the obstacle. A detailed description of the actual environment information is the same as that described above.

However, an object 635 that affects a signal may not be included in the image information.

For example, referring to satellite information 630 in FIG. 6, it may be seen that the object 635 is located behind the obstacle 625. However, the computing apparatus cannot obtain characteristic information of the object 635 because the image information does not include the object 635. Accordingly, when the computing apparatus maps actual environment information to the map information for simulations, it cannot map the characteristic information of the object 635. The characteristics of the object 635 may not be incorporated into the map information. Accordingly, the characteristics of the object 635 may not be incorporated into RT simulation, and the accuracy of simulation results may be decreased.

Accordingly, there is a need for a method of incorporating characteristic information of an object, not included in image information, into the map information. For this, the disclosure proposes a method of determining area information of an object based on satellite information and determining characteristic information of the object located in the area based on at least one of the satellite information or image information. Furthermore, the disclosure proposes a method of mapping, to map information, area information of an object and characteristic information of the object. In the disclosure, a process of mapping characteristic information of an object to map information may be configured with a process of generating new map information.

Figure 7A:
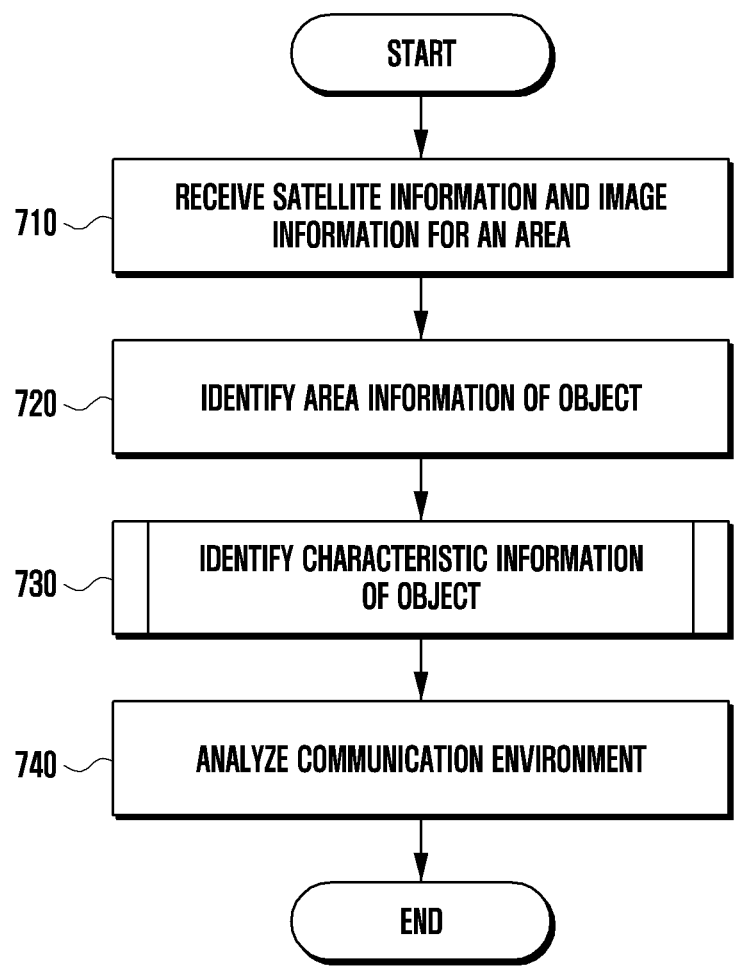
FIG. 7A is a diagram illustrating a simulation method according to an embodiment of the disclosure.

FIG. 7A is a diagram illustrating a simulation method according to an embodiment of the disclosure.

Referring to FIG. 7A, at operation 710, the computing apparatus may receive satellite information and image information for an area. As described above, the image information may include additional information. The additional information may include photographing information, including at least one of location information, direction information, view angle information, or pixel information of a captured image. Furthermore, the satellite information may mean information obtained from satellites.

Furthermore, at operation 720, the computing apparatus may identify area information of an object. The computing apparatus may identify (or extract) the area information of the object based on the satellite information. In this case, the computing apparatus may identify area information of an object not included in the image information. In the disclosure, an object not included in image information may include an object that is included in the image information, but whose characteristic information cannot be identified.

Alternatively, the computing apparatus may identify all of pieces of area information of an object included in satellite information. Accordingly, information on the area where an object is located may include information on all areas in which the object having a preset condition is located, and information on the area where an object not included in image information is located.

In this case, the computing apparatus may identify information on an area where an object that satisfies a preset condition is located. In the disclosure, the object satisfying the preset condition may mean an object that causes the attenuation of a signal attributable to at least one of transmission, absorption, diffraction or scattering of a radio wave. However, in the disclosure, the preset condition is not limited thereto. As described above, an object that satisfies a preset condition may be defined as only some parameters of transmission, absorption, diffraction or scattering. Furthermore, an object that satisfies a preset condition may mean an object in which at least one of the absorption rate, transmissivity, scattering ratio or diffraction rate of a radio wave exceeds a threshold, and may be defined as only some of the parameters. For example, an object that satisfies a preset condition may mean an object in which at least one of an absorption rate, a scattering ratio or a diffraction rate exceeds a threshold.

Furthermore, for example, an object having a preset condition may mean an object in which the absorption rate of a signal is greater than a predetermined threshold absorption rate. In this case, a tree has the properties that the attenuation of a signal greatly occurs due to the properties of absorbing the signal or the properties of diffracting the signal. In this case, the absorption rate of the signal may be greater than a predetermined threshold absorption rate. In contrast, a building has a relatively small absorption rate of a signal. The absorption rate of the signal may be smaller than a predetermined threshold absorption rate. Accordingly, the object according to the example may include a tree. The computing apparatus may identify information on the area where a tree is located.

Furthermore, the scattering ratio and the transmissivity may be applied in the same manner A case where two or more parameters exceed respective thresholds may be set as the preset condition.

As described above, a preset condition may be set based on the characteristics of an object to be extracted. For another example, an object having a preset condition may be defined as an object in which the attenuation of a signal occurs about 7 dB per meter (m).

Alternatively, in the disclosure, an object having a preset condition may be determined based on various conditions, such as that an object in which the attenuation of a signal attributable to reflection occurs is determined as an object having a preset condition.

The information on the area where the object is located may be configured with contour information of the area where the object is located. The contour information may mean information in which the area where objects have been distributed is indicated along the edges of the objects. In this case, the contour information may be indicated as the sum of coordinate information. The computing apparatus may identify the contour of the area where objects are disposed along the edge of the area where the objects have been distributed, and may configure contour information as a set of coordinates corresponding to the contour. Detailed contents of the area information are described below.

Furthermore, at operation 730, the computing apparatus may identify characteristic information of the object. Specifically, the computing apparatus may identify characteristic information of an object located in an area identified based on the image information. Specifically, the computing apparatus may identify characteristic information of each object located in an area. However, the identified area is an area not included in the image information. A method of identifying characteristic information of an object located in an area based on image information is necessary, and detailed contents thereof are described later.

The characteristic information of the object may include shape information, density information or size information of the object. Furthermore, the size information may include width information, height information, etc.

In this case, as described above, an object may be divided into two or more parts depending on a degree of signal attenuation. As described above, if a difference in the size of the attenuation of a signal is greater than a threshold, an object may be divided into a first part and a second part. In the disclosure, a part having a greater size of the attenuation of a signal is defined as a first part. The computing apparatus may divide an object into a first part and a second part using deep learning. Accordingly, the computing apparatus may divide an object into a first part and a second part, and may analyze the characteristics of the first part and the characteristics of the second part. For example, the computing apparatus may determine at least one of shape information, density information or size information of the first part and second part of an object. Alternatively, the computing apparatus may identify some of the aforementioned information or may further identify additionally necessary information. In this case, the additionally necessary information may include information on the type of object.

For example, in the case of a tree, absorption and transmission degrees of a signal in a foliage part may be different depending on the type of tree. Accordingly, the computing apparatus may determine an influence on a signal when analyzing a communication environment by identifying information on the type of object.

Furthermore, at operation 740, the computing apparatus may analyze a communication environment based on the characteristic information of the object. Specifically, the computing apparatus may map the characteristic information of the object to the map information, and may perform simulations based on the map information.

In this case, the computing apparatus may generate map information by mapping, to map information, information on the area where the object is located, each object identified from the area, or characteristic information of each object, or based on such information.

Specifically, the computing apparatus may receive pre-generated map information, and may generate new map information by mapping the received information to the map information. In this case, the computing apparatus may receive map information in any one of operation 710 to operation 740 or before and after a corresponding operation.

More accurate simulation results can be provided by performing RT simulations into which the characteristics of an object not included in image information have been incorporated as described above. Furthermore, efficient network planning can be performed by setting at least one optimum location of a transmitter and determining a ray that satisfies a set criterion among rays corresponding to the transmitter.

Figure 7B:
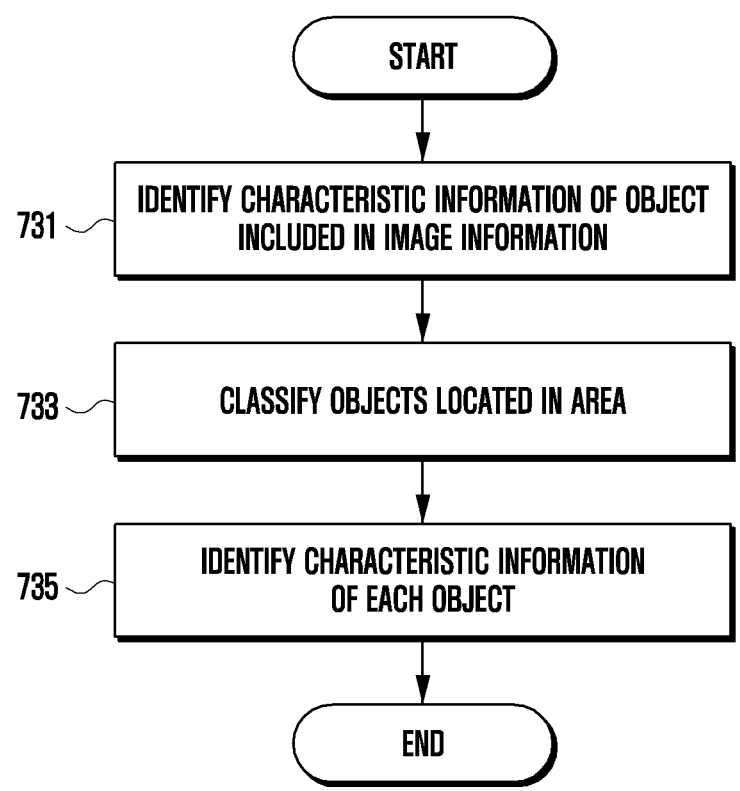
FIG. 7B is a diagram illustrating a method of identifying characteristic information of an object not included in image information according to an embodiment of the disclosure.

FIG. 7B is a diagram illustrating a method of identifying characteristic information of an object not included in image information according to an embodiment of the disclosure.

Referring to FIG. 7B, at operation 731, the computing apparatus may identify characteristic information of an object included in image information. In this case, the characteristic information of the object is the same as that described above, and description thereof is omitted.

Furthermore, at operation 731, the computing apparatus may classify, as an individual object, an object located in an area not included in the image information. The area not included in the image information may mean an area corresponding to area information of an object identified at operation 720.

The area may include a plurality of objects. Accordingly, the computing apparatus may classify, as respective objects, a plurality of objects located in the identified area. A detailed method is described later.

Furthermore, at operation 735, the computing apparatus may identify characteristic information of the classified objects. Specifically, the computing apparatus may identify characteristic information of an object that is not included in the image information or an object (second object) that is included in the image information, but whose characteristic information cannot be identified, based on the characteristic information of the object (first object) included in the image information identified at operation 731. Detailed contents thereof are described later.

The sequence of operations 731 and 733 may be changed.

Figure 8:
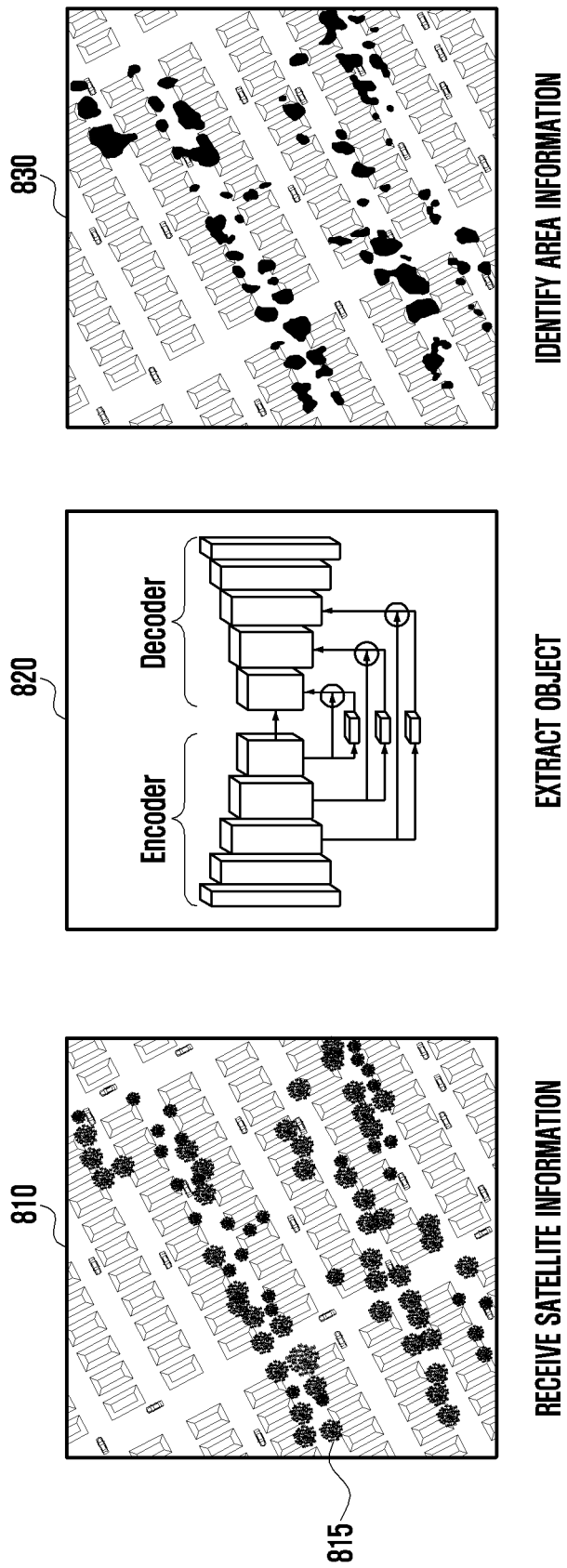
FIG. 8 is a diagram illustrating a detailed method of identifying area information of an object located in a communication path according to an embodiment of the disclosure.

FIG. 8 is a diagram illustrating a detailed method of identifying area information of an object located in a communication path according to an embodiment of the disclosure.

Referring to FIG. 8, the computing apparatus may receive satellite information 810. The satellite information means information received from satellites. The computing apparatus may identify information on object not included in image information based on the satellite information. As described above, an object not included in image information may include an object that is included in image information, but whose characteristic information cannot be identified.

For example, an object 815 may be present in an area not appearing in image information. The computing apparatus may identify the location of the object 815 based on the satellite information.

Furthermore, the computing apparatus may extract the object using a deep learning (820) method. The computing apparatus may classify information included in the satellite information based on a deep learning-based computer vision technology, and may extract an object that satisfies a preset condition among the information. Deep learning is a technology for receiving a lot of data and classifying similar data. Accordingly, the computing apparatus may classify things included in image information by labeling the image information based on deep learning data, and may extract an object whose characteristic information is to be identified among the things. As described above, the computing apparatus may classify various types of obstacles in image information, and may identify an object that satisfies a preset condition among the obstacles.

Furthermore, if an object not extracted based on the satellite information is present, the object may be updated using a manual method. In this case, a user may manually update an object that is included in satellite information, but has not been extracted.

Furthermore, the computing apparatus may determine area information of an object 830 based on the extraction results. Accordingly, the computing apparatus may determine the area where an object not included in image information is located based on the area information, and may use the area information for simulations.

In this case, the area information may be configured with contour information of a plurality of objects. The contour information may be configured with the coordinates of the boundary of objects included in the satellite information. The computing apparatus may classify the area where an object is located by matching a set of the coordinates to map information.

Accordingly, the computing apparatus may apply, to simulations, area information of an object not included in the image information.

Figure 9:
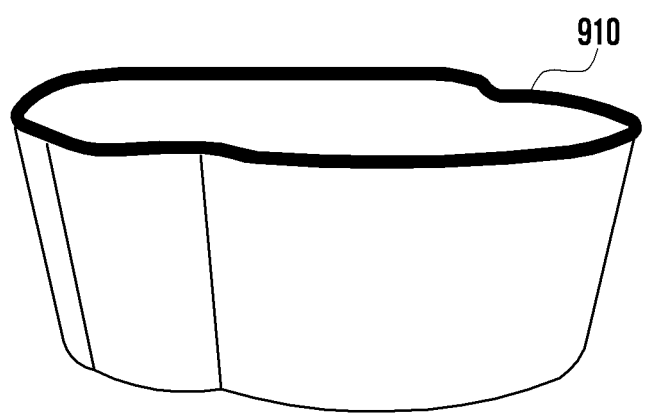
FIG. 9 is a diagram illustrating an example of area information of an identified object according to an embodiment of the disclosure.

FIG. 9 is a diagram illustrating an example of area information of an identified object according to an embodiment of the disclosure.

Referring to FIG. 9, area information may be configured with contour information 910. That is, if a plurality of objects is located in the same area, area information may be configured with the boundary of the objects. This may be called contour information.

Furthermore, as described above, the contour information may be configured with the coordinates of the boundary of objects. Specifically, the computing apparatus may identify the contour of an object included in satellite information using deep learning, and may obtain the coordinates of the contour (or a set of pixels) using an embedded function of image processing (OpenCV). Accordingly, the computing apparatus may determine area information for an object not included in image information, and may use the area information for simulations.

However, the computing apparatus cannot precisely predict a degree of signal attenuation based on only information on the area where an object is located. Accordingly, there is a need for a method of identifying the characteristics of each object located in the area information. However, the area is an area not included in image information. The disclosure proposes a method of identifying characteristic information of an object included in image information and identifying the characteristics of each object located in an area not included in image information based on the characteristic information. To this end, a method of identifying characteristic information of an object included in image information is described.

Figure 10A:
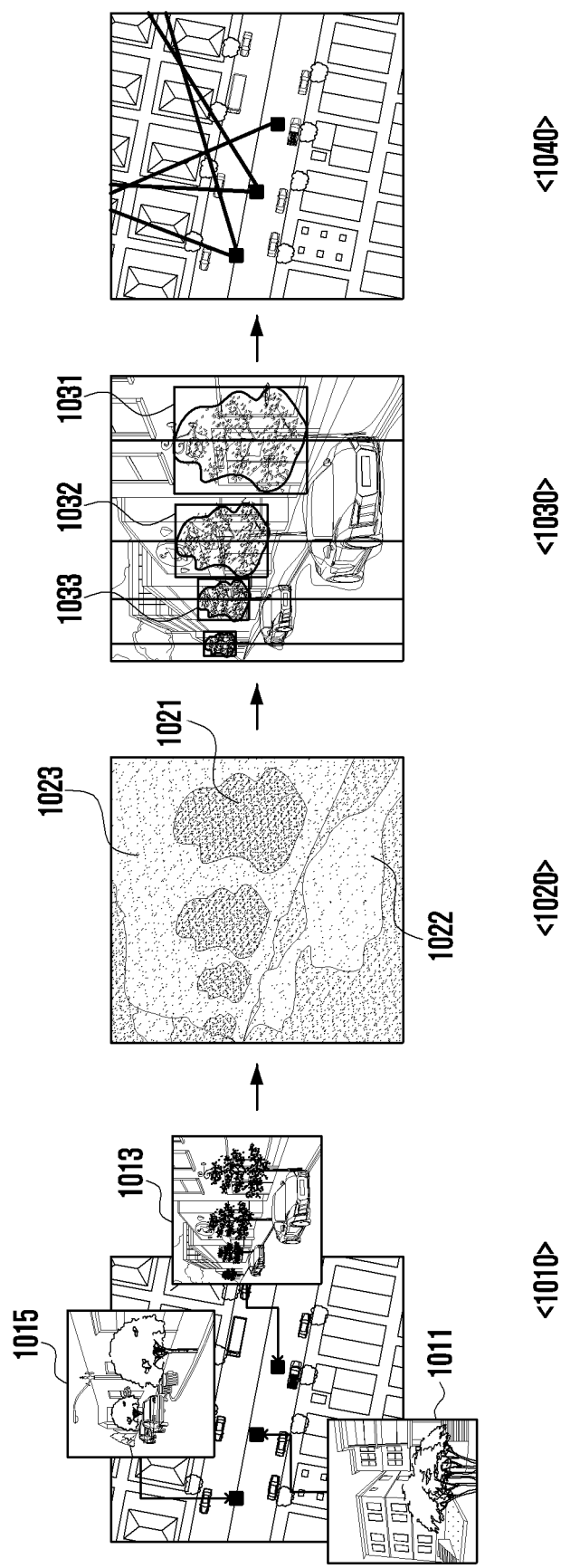
FIG. 10A is a diagram illustrating a method of extracting an object from image information according to an embodiment of the disclosure.

FIG. 10A is a diagram illustrating a method of extracting an object from image information according to an embodiment of the disclosure.

Referring to FIG. 10A, the computing apparatus may receive image information 1011, 1013, and 1015.

As described above, the image information may include photographing information, such as location information, direction information, view angle information, and pixel information of a captured image. Accordingly, the computing apparatus may identify information on an image captured at each location.

Furthermore, the computing apparatus may determine information on the location of an object included in the image information, and detailed contents thereof are described later.

Furthermore, the computing apparatus may extract an object based on the image information. The computing apparatus may classify various types of objects included in the image information using deep learning, and may extract an object having a desired type.

Specifically, <1020> in FIG. 10A illustrates a process of classifying objects using deep learning. Objects classified as the same pattern using deep learning may be classified as the same type. Referring to <1020>, a vehicle 1022, a tree 1021, and a building 1023 may be classified different types of objects. Furthermore, trees may be classified as the same type of object. However, the illustrated method is merely an example of a method of classifying objects using deep learning. The computing apparatus may perform deep learning in various manners. For example, an object classified as a different pattern may be classified as the same type of object depending on setting. Accordingly, a building and a vehicle may be classified as the same type of object. A person and a vehicle may be classified as the same type as objects having mobility.

As described above, the computing apparatus may extract an object having a desired type using deep learning. In the disclosure, a case where a first type object 1031 in which the attenuation of a signal may occur while transmitting a radio wave as in <1030> is extracted is described as an example. Detailed contents of the first type object are the same as those described above. For example, a tree may be included in the first type object.

Accordingly, the computing apparatus may identify an object having a desired type using deep learning, and may display the identified object in an image. To this end, the computing apparatus may identify location information of the object.

A method of determining the location of an object is illustrated in <1040>. The computing apparatus may determine the location of an object based on at least one of latitude information, longitude information, angle information or pixel information of the object.

Furthermore, the computing apparatus may use information on an image captured at a different place. Alternatively, the computing apparatus may use received satellite information.

For example, the computing apparatus may compute direction information and angle information for one object at a different location based on information on an image captured at a different place. As described above, if direction information and angle information for one object are used at at least three locations, location information of the object can be computed. In this case, the location information of the object may include latitude information and longitude information for the place where the object is located.

Alternatively, the computing apparatus may determine the location of an object based on photographing information of the object extracted from satellite information and image information.

The computing apparatus may identify location information of each object by repeatedly performing the process. Furthermore, the computing apparatus may store location information of each object in a database (DB).

Furthermore, the computing apparatus may determine the extracted characteristic information of the object, and detailed contents thereof are described below.

Figure 10B:
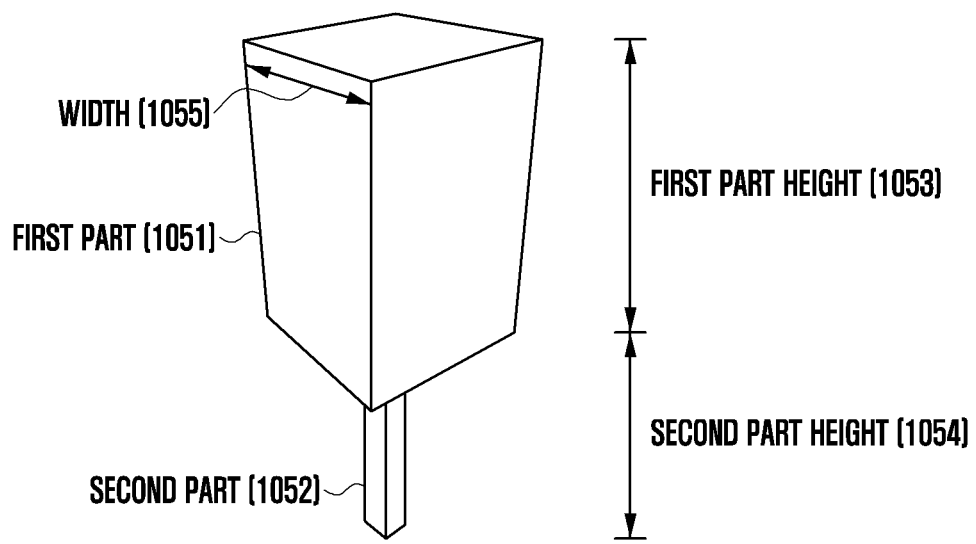
FIG. 10B is a diagram illustrating characteristic information of an object according to an embodiment of the disclosure.

FIG. 10B is a diagram illustrating characteristic information of an object according to an embodiment of the disclosure.

A method of identifying the characteristics of an object included in image information is described with reference to FIG. 10B.

The characteristic information of the object may include shape information, size information, density information, etc.

A detailed method of identifying shape information is described below. The computing apparatus may identify a shape of an object along the edge of the object using computer vision, and may classify the shape by analyzing similarity to a predefined form or a predetermined shape. In this case, the predefined form may be variously defined as a triangle, an inverted triangle, a circle or a square, for example. The computing apparatus may identify to which form an object is most similar. However, the predefined form is not limited thereto. That is, a different form may be added to the predefined form or some of the aforementioned form may be deleted. Furthermore, if the similarity does not exceed a threshold as a result of the determination of the similarity, a method for the computing apparatus to add a shape of a first part as a new shape is possible.

Furthermore, if an object is divided into a first part 1051 and a second part 1052, the computing apparatus may identify a shape of each of the first part and the second part, or may identify a shape of only one of the parts. In this case, the first part of the object may mean a part in which the size of the attenuation of a signal is great as described above.

For example, if an object is a tree, the first part 1051 in which the size of the attenuation of a signal is great may correspond to a foliage part. The computing apparatus may classify a shape of the foliage part. In this case, a predefined form may include a triangle, a circle, a square, and an inverted triangle, for example. The computing apparatus may identify the shape of the foliage part.

The computing apparatus may not identify a shape of a trunk, that is, the second part 1052. The reason for this is that in most of trees, trunk parts have a similar shape and the influence of the attenuation of a signal attributable to a difference between shapes is rarely changed. Alternatively, in the case of trees, in general, trunks have a similar shape. Accordingly, the computing apparatus may use a predetermined shape.

Furthermore, a method of determining size information of an object is described below.

The computing apparatus may identify size information of an object based on another object included in image information. The size information may include height information 1053 and 1054 and width information 1055. The computing apparatus may determine size information of an object based on height information or width information of another object. In the disclosure, size information of another object is referred to as reference information.

For example, the reference information may include height information of a building located near an object, width information of means of transportation (e.g., a car), etc.

Height information of a building, width information of means of transportation, etc. may have been stored in the computing apparatus. Accordingly, the computing apparatus may determine size information of an object based on reference information and the size ratio of the object. Alternatively, the computing apparatus may compute a length per pixel of image information based on reference information, and may identify height information and width information of a first part and second part based on the computed results.

For example, if the width of one means of transportation is 3 m and a pixel area occupied in image information is 600 px, the length of the width per 1 px may be identified as 0.5 cm. Accordingly, the computing apparatus may compute width information of an object by multiplying the number of pixels, occupied in the width of the object, by 0.5.

Likewise, for example, if the height of one building is 10 m and a pixel area occupied in image information is 1000 px, the length of the height per 1 px may be identified as 1 cm. Furthermore, if a pixel area occupied by the height of an object is 800 px, the computing apparatus may compute height information of the object as 8 m by multiplying the number of pixels, occupied by the height of the object, by 1.

Furthermore, if an object is divided into a first part and a second part, the computing apparatus may determine size information and width information of each of the first part and the second part.

Furthermore, method of determining density information of an object is described below.

The computing apparatus may determine density information using computer vision. The computing apparatus may classify density information into three stages, such as a high density state (density), a middle density state (mid), and a low density state (sparse), for example. The computing apparatus may determine type information of an object in order to determine density information. The computing apparatus may identify the type of each object using training data through a deep learning method. Furthermore, the computing apparatus may determine density information based on type information of an object.

For example, if an object is a tree, the computing apparatus may identify the type of tree using deep learning. For example, trees may be classified into a needleleaf tree, a broadleaf tree, and others. Furthermore, the computing apparatus may determine the needleleaf tree as "sparse", others as "mid", and the broadleaf tree as "density" depending on the type of tree.

Furthermore, the type information of an object is characteristic information of the object, and may be used for simulations. For example, a degree of scattering, a degree of absorption, or a degree of transmission according to the type of object may be digitized. This may be incorporated into map information and used for simulations. In this case, the computing apparatus may digitize at least one of the pieces of information of a degree of scattering, a degree of absorption, or a degree of transmission according to the type of object, and may incorporate the information into the map information.

Furthermore, if an object is divided into a first part and a second part, the computing apparatus may determine density information of each of the first part and the second part, or may determine only density information of any one of the two parts.

For example, if an object is a tree, the computing apparatus may determine density information of a foliage part, that is, a first part.

Density information of a second part may not be determined because the density information of a trunk, that is, the second part, has less influence on a signal.

However, an embodiment of the disclosure is not limited thereto. That is, density information may be divided into three or more states according to circumstances. Furthermore, in density information, the densities of the central part and peripheral part of an object may be differently determined based on shape information.

Furthermore, the computing apparatus may determine characteristic information of each object by repeatedly performing the process on the object included in image information, and may store the characteristic information in a database.

Furthermore, the computing apparatus may map the obtained characteristic information of the object to map information, may use the map information for simulations, and may determine an optimum Tx location according to simulation results.

However, in the disclosure, the computing apparatus may determine only at least one of shape information, size information, or density information in the process of determining characteristic information of the object. For example, if density information is not computed, the computing apparatus may map only shape information and size information to the map information, and may use the map information for simulations.

Hereinafter, a method of identifying characteristic information of an object not included in image information based on characteristic information of an object obtained using the aforementioned method, and a method of analyzing a communication environment based on the characteristic information are proposed.

Specifically, in the disclosure, the computing apparatus may separate objects, located in area information (or contour information) of an object, for each object, and may identify characteristic information of each object. A detailed method of separating objects is described later with reference to FIG. 11.

In this case, in order to determine the characteristic information of each object, characteristic information of an object included in the aforementioned image information may be used. For example, the computing apparatus may determine characteristic information of each object as an average value of pieces of characteristic information of objects that are disposed nearly. That is, the computing apparatus may apply an average value of pieces of characteristic information of objects, obtained based on image information, to an object not included in the image information. Specifically, the computing apparatus may determine characteristic information of each object based on characteristic information of an object, identified based on image information, among objects located within a predetermined range of the area of an object not included in the image information.

For example, the computing apparatus may set an average value of pieces of width information and height information of surrounding tree as width information and height information of each tree not included in image information.

Alternatively, in the disclosure, a method of identifying characteristic information of an object not included in image information may be determined based on characteristic information of an object included in the image information within a predetermined minimum unit area (e.g., 500 m×500 m). In this case, the minimum unit area, such as an administrative district of a minimum unit, may have been previously determined.

Alternatively, in the disclosure, characteristic information of objects having the same type information in the predetermined minimum unit area may be used. That is, the computing apparatus may identify type information of an object not included in image information, and may determine characteristic information of the corresponding object based on characteristic information of an object having the same type information. For example, if an object is a tree and a tree not included in image information is a needleleaf tree, the computing apparatus may use only characteristic information of the needleleaf tree.

Detailed contents of the example are described below.

Figure 10C:
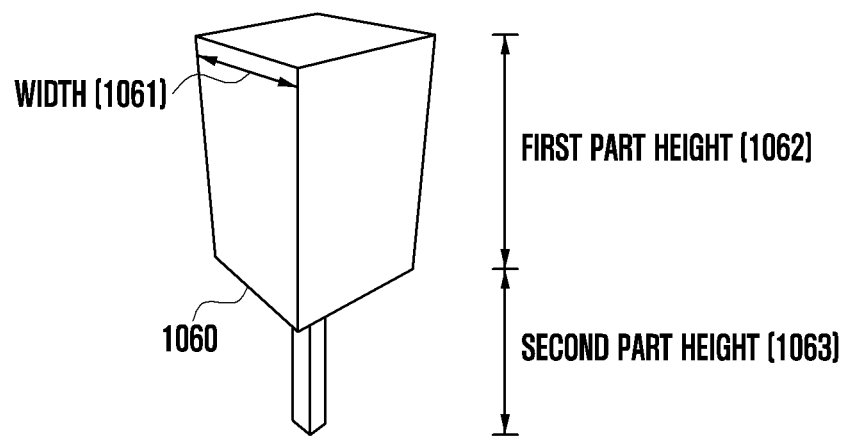
FIG. 10C is a diagram illustrating a method of determining characteristic information of each object according to an embodiment of the disclosure.
Figure 10C:
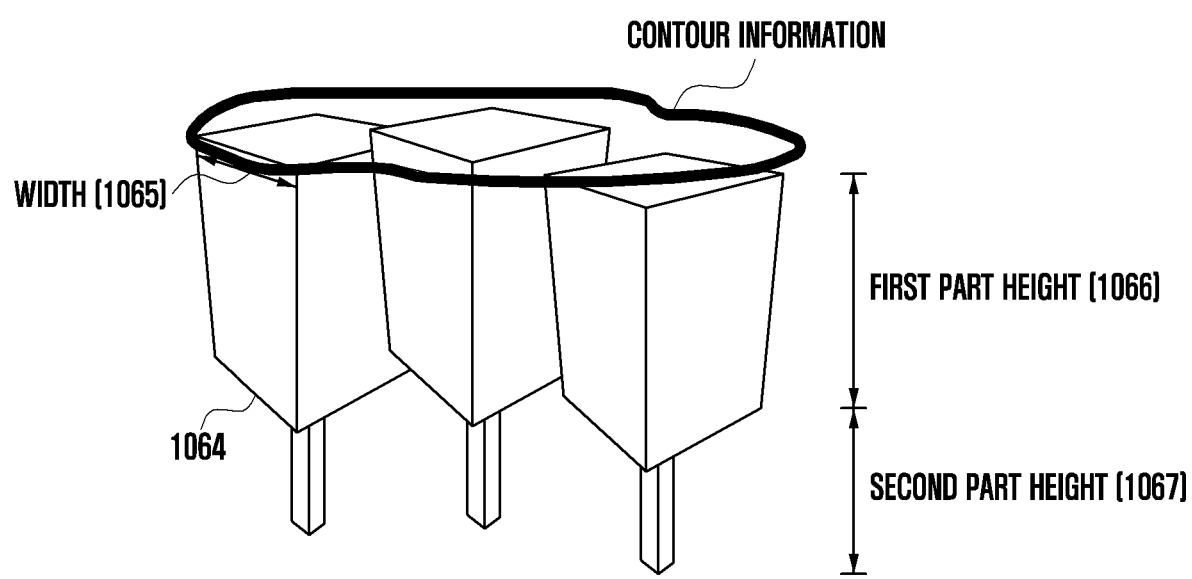

FIG. 10C is a diagram illustrating a method of determining characteristic information of each object according to an embodiment of the disclosure.

Referring to FIG. 10C, the computing apparatus may determine characteristic information (width information 1061 and height information 1062 and 1063) of an object 1060 included in image information. In this case, the height information may be divided into the height information 1062 of a first part and the height information 1063 of a second part. Corresponding detailed contents are the same as those described above, and are omitted hereinafter.

In the disclosure, an object that is included in image information and whose characteristic information can be identified may be referred to as a first object. In this case, an object that is included in image information, but whose characteristic information cannot be identified may not be included in a first object.

Furthermore, in the disclosure, an object not included in image information may be referred to as a second object 1064. In this case, an object that is included in the image information, but whose characteristic information cannot be identified may be classified as a second object.

The computing apparatus may estimate characteristic information of the second object 1064 based on characteristic information of a first object 1060. For example, the computing apparatus may determine characteristic information of a second object based on an average value of pieces of characteristic information of first objects located in a preset area. In this case, the preset area may be determined to be within a predetermined range in the area where the second object is located, for example. Alternatively, the preset area may be determined as a predetermined minimum unit area (e.g., 500 m×500 m).

The average value of the pieces of characteristic information of the first objects may include an average value of pieces of width information or an average value of pieces of height information. The average value of the pieces of height information may be divided into an average value of first part heights and an average value of second part heights. However, an embodiment of the disclosure is not limited thereto, and height information is not divided into two parts, but may be determined as a single value.

Accordingly, the computing apparatus may determine width information 1065 of the second object based on an average value of pieces of width information 1061 of the first objects, and may determine height information 1066 and 1067 of the second object based on an average value of pieces of height information 1062 and 1063 of the first objects. As described above, in order to determine height information of a second object, the computing apparatus may separately determine height information of a first part and the height information of the second part or may determine one piece of height information by adding the height information of the first part and the height information of the second part.

In the disclosure, a method using an average value of first objects located in a preset area is described as an example, but an embodiment of the disclosure is not limited thereto. For example, the computing apparatus may divide the same subtype of objects into subtypes based on type information within the objects having the same type. That is, the computing apparatus may divide the same subtype into subtypes of a first object and a second object, and may use an average value of pieces of characteristic information of the first object to determine characteristic information of the second object with respect to the first object and the second object having the same subtype. For example, if an object is a tree, a method of determining the type of foliage and using an average value for each type is possible. Furthermore, in the disclosure, another computing method other than an average value may be used.

Figure 10D:
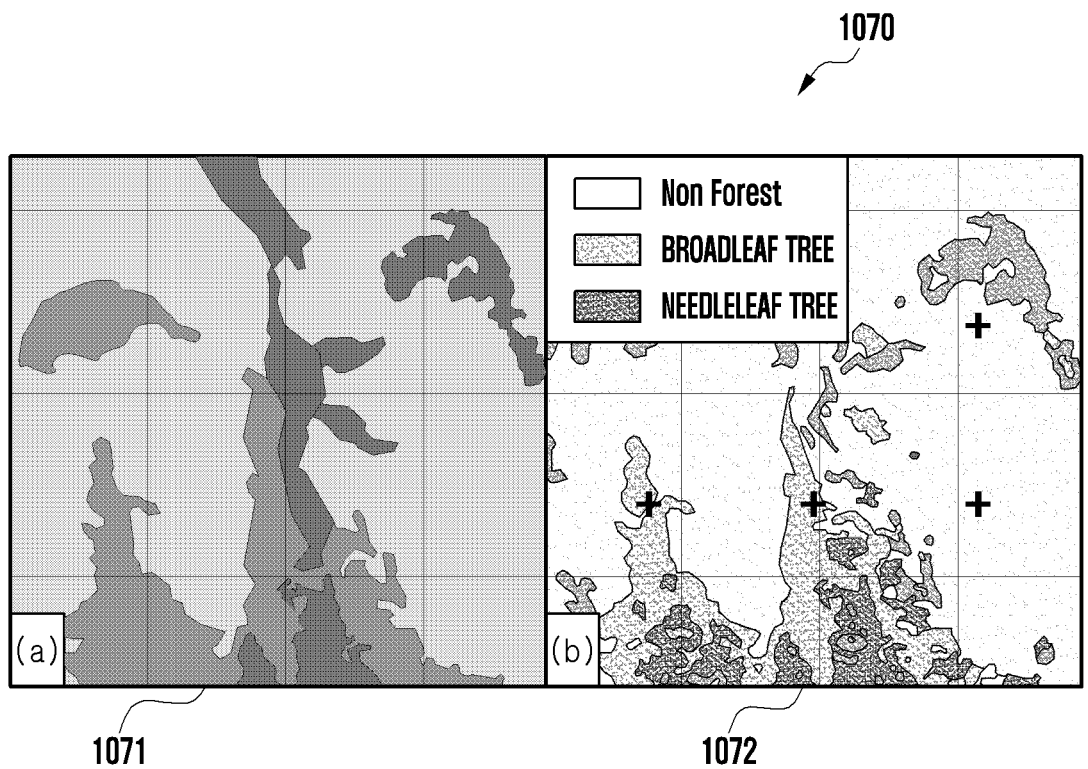
FIG. 10D is a diagram illustrating an example of characteristic information of an object according to an embodiment of the disclosure.
Figure 10D:
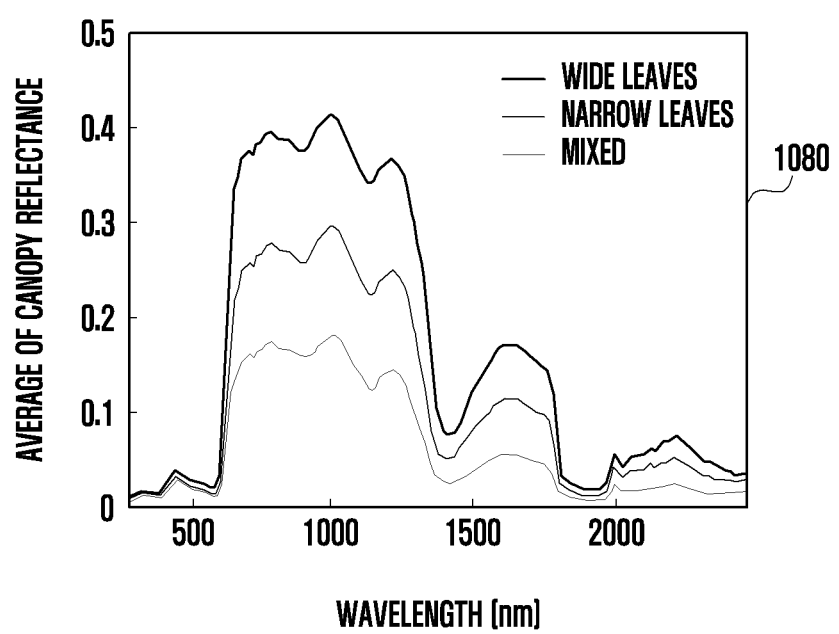

FIG. 10D is a diagram illustrating an example of characteristic information of an object according to an embodiment of the disclosure.

According to the disclosure, an object may be divided into multiple types. Objects having the same type may be differently classified based on the type of part configuring an object, which may be referred to as subtype information of an object.

Referring to FIG. 10D, characteristic information of an object may include subtype information, that is, type information of each part configuring the object.

A case where an object is a tree is described as an example. Subtype information may include information on the type of foliage configuring the tree.

As described above, a degree of signal attenuation may be different depending on subtype information. The computing apparatus can improve the accuracy of simulations by performing the simulations based on the subtype information.

Specifically, the computing apparatus may receive infrared image information 1070 in addition to satellite information, may classify objects based on the infrared image information, and may identify subtype information of the object. Referring to the infrared image information 1070, the computing apparatus may extract an object based on infrared image information 1071. Furthermore, the computing apparatus may classify the subtypes of objects based on infrared image information 1072. The computing apparatus may apply different characteristic information to objects located in the same area based on the subtypes of objects. As described above, for example, in the case of a tree, subtype may be classified based on the type of foliage. Different characteristic information may be applied to objects based on their subtypes although the objects are disposed in the same area.

Furthermore, referring to 1080, it may be seen that reflectance is different depending on the subtype of an object. The computing apparatus may set different reflectance to be applied based on the subtype of an object. That is, the computing apparatus may set different characteristic information based on the subtype of each object. Accordingly, the computing apparatus can increase the accuracy of simulations by separating objects, located in an area, into individual objects and applying different characteristic information based on the subtype of each object.

In order to determine characteristic information of each object, a method of separating objects from area information (or contour information) of the objects is necessary, and detailed contents thereof is described below.

Figure 11A:
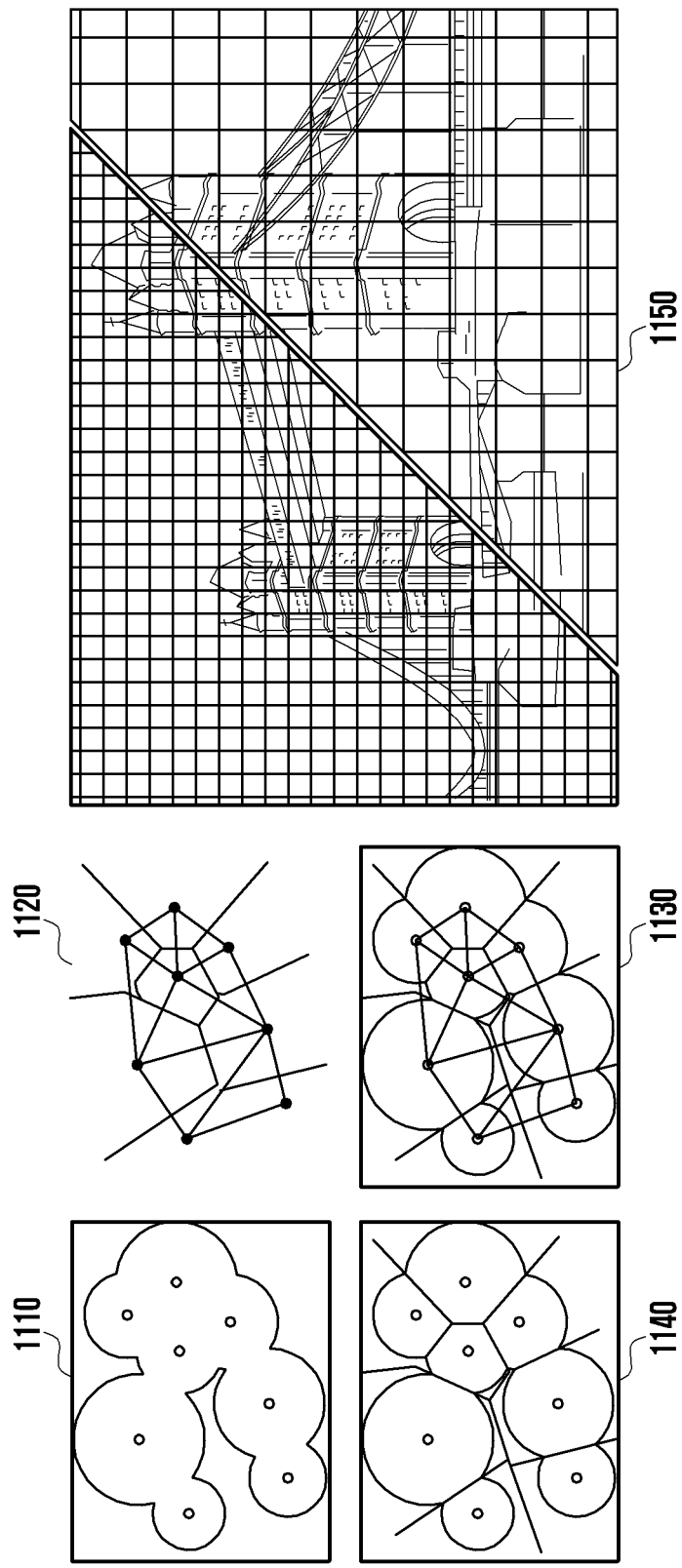
FIG. 11A is a diagram illustrating a method of identifying objects according to an embodiment of the disclosure.

FIG. 11A is a diagram illustrating a method of separating objects according to an embodiment of the disclosure.

Referring to FIG. 11A, the computing apparatus may identify objects using various methods. The computing apparatus may separate objects based on at least one of coordinate information, pixel information or location information included in satellite information. The coordinate information may include coordinate information of a center point. Furthermore, the pixel information may include the number of pixels and the compactness of pixels. For example, the computing apparatus may use a delaunay triangulation (1110, 1120, 1130, 1140) method or a superpixel (1150) method.

Specifically, if the delaunay triangulation method is used, the computing apparatus may identify the area 1110 where objects are disposed based on satellite information, and may identify the center point of the object in the area.

Furthermore, the computing apparatus may identify objects in the area using the delaunay triangulation method of splitting a face into triangles by connecting the center points of the objects in 1120, 1130, 1140.

Alternatively, the computing apparatus may identify objects using the superpixel method, such as 1150. Specifically, the computing apparatus may receive the number of super pixels and the compactness of the super pixels. Furthermore, the computing apparatus may divide image information into pixels based on the color depth of image information using an algorithm. Furthermore, the computing apparatus may compute a center point based on the divided super pixels, and may estimate the center point as the location of each object. The computing apparatus may identify objects using such a method.

Furthermore, the computing apparatus may predict characteristic information of an object which may be identified in satellite information based on characteristic information of an object identified in the image information.

Figure 11B:
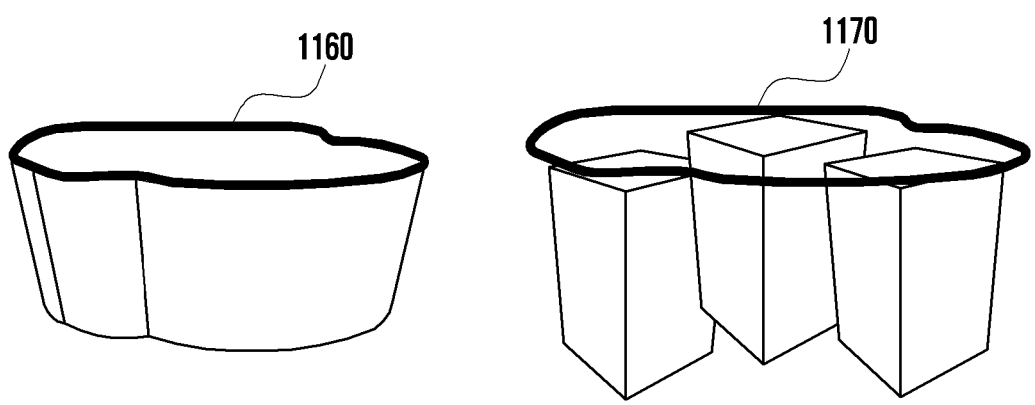
FIG. 11B is a diagram illustrating identified objects according to an embodiment of the disclosure.

FIG. 11B is a diagram illustrating separated objects according to an embodiment of the disclosure.

Referring to FIG. 11B, the computing apparatus may identify area information or contour information 1160 of an object not included in image information based on satellite information, and detailed contents thereof have been described above.

Furthermore, the computing apparatus may separate objects 1170 located in an area using the aforementioned method. The accuracy of simulations can be improved by separating objects located in an area, predicting characteristic information of the object, and mapping the characteristic information to map information or applying the characteristic information to the simulations as described above.

Figure 12:
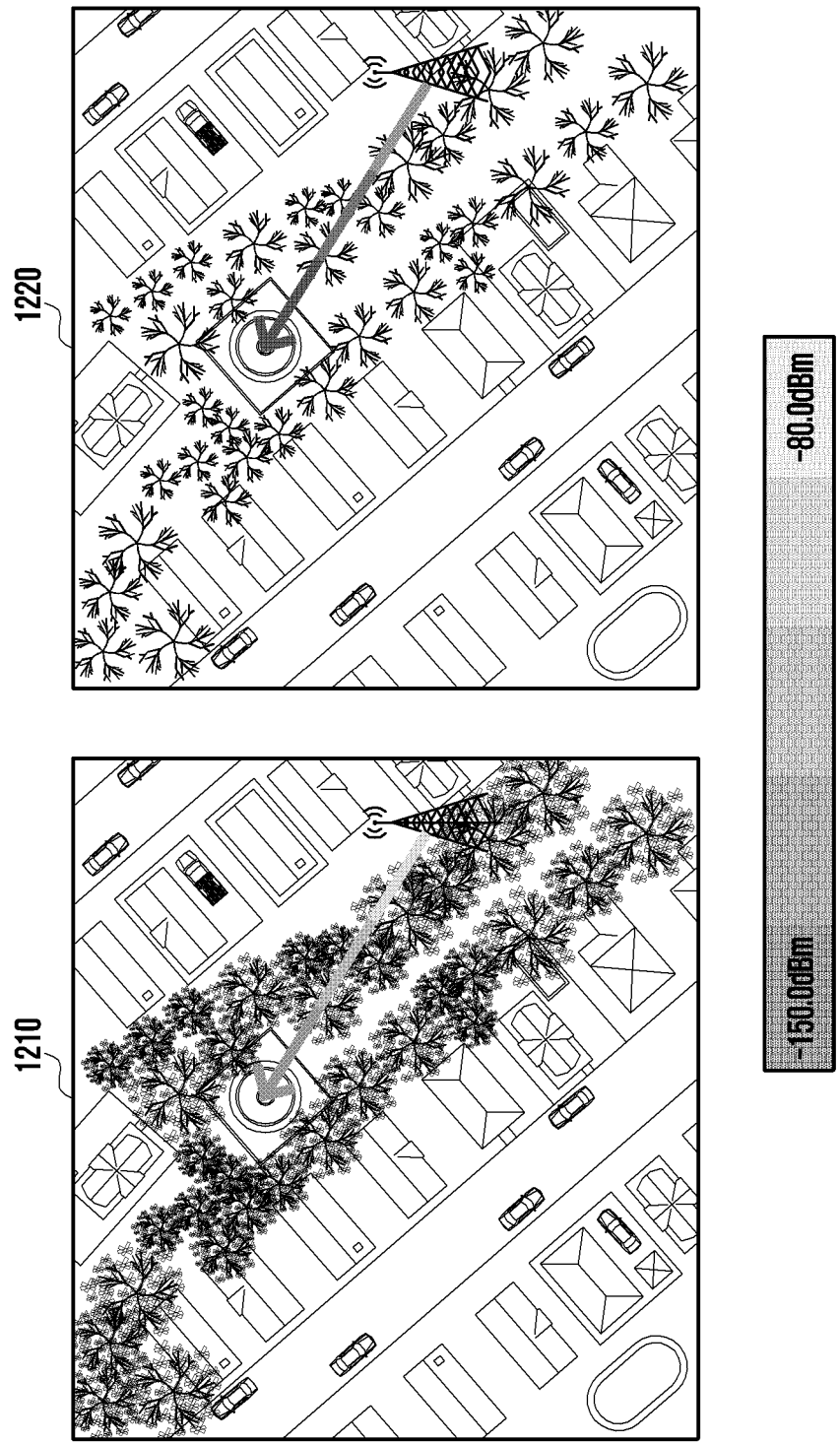
FIG. 12 is a diagram for describing a network operation method according to an embodiment of the disclosure.

FIG. 12 is a diagram for describing a network operation method according to an embodiment of the disclosure.

As described with reference to the disclosure, if a network is managed based on satellite information and image information, more accurate simulations can be performed.

Specifically, referring to FIG. 12, characteristic information of an object may be changed according to circumstances. A case where an object is a tree is described as an example. The characteristics of the object may be changed depending on a change of season.

Specifically, it may be seen that the attenuation of a signal in 1220 is greater based on a comparison between 1210 and 1220. However, even in the case of 1210, an object whose characteristic information cannot be identified may be present depending on received image information. Accordingly, the computing apparatus may predict characteristic information of an object whose characteristic information cannot be identified based on satellite information, and may derive more accurate simulation results by incorporating the characteristic information into the simulations.

Furthermore, if characteristic information of an object is changed, the computing apparatus may identify the changed characteristic information of the object using the method, may check a degree of signal attenuation according to the characteristic information, and may adjust the intensity of a beam when a network is managed.

Figure 13:
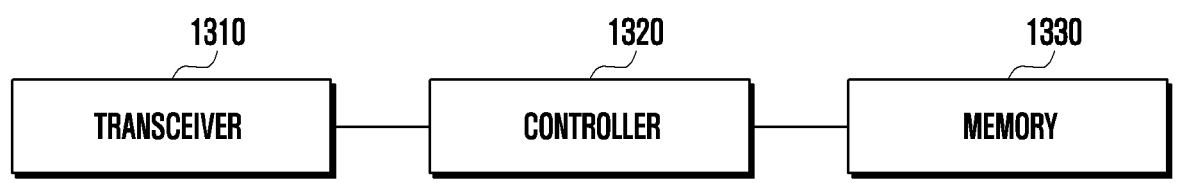
FIG. 13 is a diagram illustrating a computing apparatus according to an embodiment of the disclosure.

FIG. 13 is a diagram illustrating a computing apparatus according to an embodiment of the disclosure.

Referring to FIG. 13, the computing apparatus may include a transceiver 1310, a controller 1320, and a controller 1330.

More specifically, the computing apparatus may transmit or receive data to and from an external device, and may include an interface unit for the transmission or reception.

The controller 1320 may control an operation of the computing apparatus, and may control an overall operation of the computing apparatus so that the operations described in the embodiments and related to the computing apparatus are performed. The controller 1320 may include at least one processor. Furthermore, the processor may be controlled by a program including instructions that execute the methods described in the embodiments of this specification. Furthermore, the program may be stored in a storage medium. The storage medium may include a computer-readable storage medium for storing computer program codes. Furthermore, the storage medium may include a volatile or non-volatile memory. The memory may be a medium capable of storing data, and is not limited to any type if the memory can store the instructions.

The memory 1530 may store at least one of information related to the computing apparatus or information transmitted or received through the transceiver 1302. Furthermore, the memory may store all of pieces of information necessary for simulations in an embodiment of this specification, such as characteristic information and location information of an object. Furthermore, information stored in the memory 1330 may be added, deleted or updated based on at least one of simulation results or comparison results.

The preferred embodiments of the disclosure have been disclosed in this specification and drawings. Although specific terms have been used in this specification and drawings, they are used in common meanings in order to easily describe the technical contents of the disclosure and to help understanding of the disclosure, but are not intended to limit the scope of the disclosure. It is evident to a person having ordinary skill in the art to which the disclosure pertains that other modified examples based on the technical spirit of the disclosure are possible in addition to the disclosed embodiments.

The invention claimed is:

1. A method of analyzing a communication environment in a wireless communication system, the method comprising:
   receiving satellite information and image information;
   identifying area information including contour information of an object based on the satellite information, wherein the object does not appear in the image information because it is obscured by an obstacle appearing in the image information;
   determining an area where the object is located based on the contour information;
   determining characteristic information of the object based on at least one of the satellite information or the image information; and
   analyzing a communication environment for the area based on the characteristic information, the analyzing comprising a ray tracing (RT) simulation,
   wherein the object is an object causing a signal attenuation due to at least one of a diffraction, a scattering, or an absorption of a signal,
   wherein the object includes a first part and a second part in case that a difference of a degree of the signal attenuation between the first part and the second part exceeds a threshold, and
   wherein the characteristic information of the object includes shape information, size information, and density information of the first part and size information of the second part.

2. The method of claim 1, further comprising:
   mapping the characteristic information of the object to map information, wherein the map information associated with a map of the area is obtained by mapping, to the map information, information on the area where the object is located, each object identified from the area, or characteristic information of each object; and
   determining a location of a transmitter based on the analyzed communication environment.

3. The method of claim 1,
   wherein at least one of a scattering ratio or absorption rate of the signal scattered or absorbed by the object exceeds a threshold, and
   wherein the characteristic information includes at least one of a shape of the object, a density of the object, or a size of the object.

4. The method of claim 3, wherein analyzing the communication environment includes:
   identifying locations of a transmitter and a receiver in map information, wherein the map information associated with a map of the area is obtained by mapping, to the map information, information on the area where the object is located, each object identified from the area, or characteristic information of each object; and
   analyzing the communication environment based on the map information.

5. A computing apparatus analyzing a communication environment in a wireless communication system, the computing apparatus comprising:
   a transceiver; and
   a controller configured to:
      receive satellite information and image information for an area,
      identify area information including contour information of an object based on the satellite information, wherein the object does not appear in the image information because it is obscured by an obstacle appearing in the image information,
      determine an area where the object is located based on the contour information,
      determine characteristic information of the object based on at least one of the satellite information or the image information, and
      analyze a communication environment for the area based on the characteristic information, the analyzing comprising a ray tracing (RT) simulation,
   wherein the object is an object causing a signal attenuation due to at least one of a diffraction, a scattering, or an absorption of a signal,
   wherein the object includes a first part and a second part in case that a difference of a degree of signal attenuation between the first part and the second part exceeds a threshold, and
   wherein the characteristic information of the object includes shape information, size information, and density information of the first part and size information of the second part.

6. The computing apparatus of claim 5, wherein the controller is further configured to:
   map the characteristic information of the object to map information, wherein the map information associated with a map of the area is obtained by mapping, to the map information, information on the area where the object is located, each object identified from the area, or characteristic information of each object, and
   determine a location of a transmitter based on the analyzed communication environment.

7. The computing apparatus of claim 5,
wherein at least one of a scattering ratio or absorption rate of the signal scattered or absorbed by the object exceeds a threshold, and
wherein the characteristic information comprises at least one of a shape of the object, a density of the object, or a size of the object.

8. The computing apparatus of claim 7, wherein the controller is further configured to:
identify locations of a transmitter and a receiver in map information, wherein the map information associated with a map of the area is obtained by mapping, to the map information, information on the area where the object is located, each object identified from the area, or characteristic information of each object, and
analyze the communication environment based on the map information.

9. A non-transitory storage medium storing a program comprising instructions which, when executed, cause an apparatus to:
receive satellite information and image information;
identify area information including contour information of an object based on the satellite information, wherein the object does not appear in the image information because it is obscured by an obstacle appearing in the image information;
determine an area where the object is located based on the contour information;
determine characteristic information of the object based on at least one of the satellite information or the image information; and
analyze a communication environment for the area based on the characteristic information, the analyzing comprising a ray tracing (RT) simulation,
wherein the object is an object causing a signal attenuation due to at least one of a diffraction, a scattering, or an absorption of a signal,
wherein the object includes a first part and a second part in case that a difference of a degree of signal attenuation between the first part and the second part exceeds a threshold, and
wherein the characteristic information of the object includes shape information, size information, and density information of the first part and size information of the second part.

10. The non-transitory storage medium of claim 9, wherein the instructions further cause the apparatus to:
map the characteristic information of the object to map information, wherein the map information associated with a map of the area is obtained by mapping, to the map information, information on the area where the object is located, each object identified from the area, or characteristic information of each object; and
determine a location of a transmitter based on the analyzed communication environment.

11. The non-transitory storage medium of claim 9,
wherein at least one of a scattering ratio or absorption rate of the signal scattered or absorbed by the object exceeds a threshold, and
wherein the characteristic information includes at least one of a shape of the object, a density of the object, or a size of the object.

12. The non-transitory storage medium of claim 11, wherein analyzing the communication environment includes:
identifying locations of a transmitter and a receiver in map information, wherein the map information associated with a map of the area is obtained by mapping, to the map information, information on the area where the object is located, each object identified from the area, or characteristic information of each object; and
analyzing the communication environment based on the map information.

* * * * *